United States Patent [19]

Fujiwara et al.

[11] Patent Number: 5,331,055
[45] Date of Patent: Jul. 19, 1994

[54] PROCESS FOR PRODUCING VINYL ESTER POLYMER AND PROCESS FOR PRODUCING VINYL ALCOHOL POLYMER

[75] Inventors: Naoki Fujiwara; Kazutoshi Terada; Hitoshi Maruyama, all of Kurashiki, Japan

[73] Assignee: Kuraray Co., Ltd., Kurashiki, Japan

[21] Appl. No.: 928,774

[22] Filed: Aug. 17, 1992

Related U.S. Application Data

[63] Continuation-in-part of Ser. No. 705,643, May 24, 1991, abandoned.

[30] Foreign Application Priority Data

May 28, 1990 [JP]  Japan .................................. 2-138963

[51] Int. Cl.$^5$ .............................. C08F 2/24; C08F 2/30
[52] U.S. Cl. ................................... 525/244; 525/245; 525/264
[58] Field of Search ....................... 525/244, 245, 264

[56] References Cited

U.S. PATENT DOCUMENTS 2,587,562  2/1952  Wilson .
4,164,489  9/1979  Daniels et al. .................. 526/65
4,226,752  10/1980  Erickson et al. ................. 525/301

FOREIGN PATENT DOCUMENTS 0100892  2/1984  European Pat. Off. .
0250607  1/1988  European Pat. Off. .
0305585  3/1989  European Pat. Off. .

OTHER PUBLICATIONS

"Contemporary Polymer Chemistry", Allcock, Prentice Hall, Englewood Cliffs, N.J., pp. 281-283 (1981).
Journal of the American Chemical Society, Shultz, pp. 3422-3430 (1954). (month unavailable).
Chemical Abstracts, vol. 89, No. 12, Sep. 1978, p. 26, Column 1, Abstract 89: 90636b, Columbus, Ohio, US.

*Primary Examiner*—John Kight, III
*Assistant Examiner*—Jeffrey Culpeper Mullis
*Attorney, Agent, or Firm*—Oblon, Spivak, McClelland, Maier & Neustadt

[57] ABSTRACT

There are disclosed a process for producing a vinyl ester polymer having a high degree of polymerization at a high efficiency, which process comprises subjecting a vinyl ester monomer to seed polymerization by the use of a vinyl ester polymer emulsion as a seed emulsion under the conditions in which the charge of a water-soluble initiator per unit volume (1 liter) of reactant liquid charge is $1 \times 10^{-8}$ to $2 \times 10^{-4}$ mol, and the charge of the water-soluble initiator per one particle of the vinyl ester polymer particles in the seed emulsion is $1 \times 10^{-28}$ to $1 \times 10^{-20}$ mol, and a process for producing a vinyl alcohol polymer at a high efficiency from the vinyl ester polymer thus obtained.

According to these processes of the present invention, both a vinyl ester polymer and vinyl alcohol polymer each having a higher degree of polymerization can be produced with ease on an industrial scale.

11 Claims, No Drawings

PROCESS FOR PRODUCING VINYL ESTER POLYMER AND PROCESS FOR PRODUCING VINYL ALCOHOL POLYMER

This application is a continuation-in-part of application Ser. No. 07/705,643, filed on May 24, 1991, now abandoned.

BACKGROUND OF THE INVENTION

1. Field of the Invention

The present invention relates to a process for producing vinyl ester polymer and a process for producing vinyl alcohol polymer. More particularly, it pertains to a process for producing vinyl ester polymer having a high degree of polymerization by means of seed polymerization or emulsion polymerization, a process for producing vinyl alcohol polymer having a high degree of polymerization by the use of said vinyl ester polymer obtained by the above-mentioned process, and a process for producing vinyl ester polymer emulsion well suited for use as a seed emulsion.

2. Description of the Related Arts

Vinyl ester polymer, especially vinyl acetate polymer is widely utilized as a base polymer of adhesives and paints, and is also of great importance as a raw resin of vinyl alcohol polymer. It is also well-known that vinyl alcohol polymer is not only utilized as a paper processing agent, textile processing agent, emulsion stabilizer, etc. but also assumes an important place as a raw material of vinylon film and vinylon fiber by virtue of its surpassing interfacial characteristics and strength properties as one of the crystalline water-soluble polymers limited in number.

Conventional vinyl alcohol polymer, however, is limited in the degree of polymerization, with an upper limit of 2000, and 3000 approximately in the case of a special product by reason of the fact that vinyl alcohol polymer having a high degree of polymerization is poor in processability and hard to handle and that vinyl acetate polymer as a raw material having a high degree of polymerization is difficult to obtain.

The recent rapid innovation in processing technique, however, has made possible the processing of polymers having a ultrahigh degree of polymerization thereby leading to success in deriving unique physical properties which have never been known. This is also the case with vinyl alcohol polymer, and that given a high degree of polymerization is expected to exhibit improved characteristic properties in the conventional application areas and also to find new uses in novel fields such as high tenacity fibers, polarizing film, etc.

As a general rule, a polymer having a high degree of polymerization is obtained by polymerization at a low temperature and at a low polymerization rate. This holds true for vinyl acetate, and several cases have been reported, (For example, A. R. Shultz; J. Am. Chem. Soc. 76, 3422(1954), G. M. Burnett, M. H. George, H. W. Melville; J. Polym. Sci. 16, 31(1955), and M. Matsumoto, Y. Ohyanagi; J. Polym. Sci, 26, 148(1960)).

However, the above-mentioned conventional processes are based on bulk polymerization, which involves several problems still unsolved such as difficulty in stirring due to high viscous polymerization system making the production of uniform polymer impossible, difficulty in removing the heat of polymerization, etc. Therefore, the industrial scale production by bulk polymerization is considered to be almost impossible.

In order to overcome the disadvantage of bulk polymerization, there is proposed a new process by suspension polymerization (Japanese Patent Application Laid-Open No. 148209/1986).

However, in a system with great chain transfer such as vinyl ester system, it is indispensable to lower the polymerization temperature for the purpose of increasing the degree of polymerization. Because of thus, the rate of polymerization is inevitably made quite low in bulk polymerization and suspension polymerization according to the reports hereinbefore.

There is also proposed another process, that is, low temperature emulsion polymerization as a process having overcome the disadvantages of the above polymerization processes, which process is different from bulk polymerization and suspension polymerization in polymerization mechanism, almost free from the problems of stirring and heat removal even at a relatively high rate of polymerization, and makes it possible to obtain vinyl ester polymer and vinyl alcohol polymer each having a high degree of polymerization (Japanese Patent Application Laid-Open No. 37106/1988).

Nevertheless, there still remain some problems in the aforementioned low temperature emulsion polymerization that a long time is required from the beginning of an initiator addition to the start of polymerization, the ratio of weight-average molecular weight of vinyl alcohol polymer having a high degree of polymerization obtained (Mw) to number-average molecular weight of the same (Mn) (Mw/Mn) is high, which means a wide range of molecular-weight distribution, and the vinyl alcohol polymer thus obtained has an average degree of polymerization of only 25,000 at the highest.

There is also known a polymerization process in which 0.01 to 0.6% by weight of an anionic emulsifier is added to vinyl chloride monomer, and prior to the completion of polymerization, at least 0.2% by weight of an nonionic emulsifier is added to the monomer to complete emulsion polymerization and produce an emulsion, which is then used as a seed emulsion for seed-polymerizing vinyl chloride monomer (Japanese Patent Application Laid-Open No. 60389/1979). The process, however, is directed to the process for producing a vinyl chloride polymer emulsion having a sharp particle size distribution and large particles and is incapable of producing a vinyl ester polymer having a high degree polymerization.

There is further known a polymerization process in which ethylene and vinyl acetate are subjected to continuous emulsion polymerization by using vinyl acetate polymer emulsion or ethylene-vinyl acetate copolymer emulsion each obtained by emulsion polymerization at 40° to 75° C. (Japanese Patent Application Laid-Open No. 145783/1979). However, the process fails to produce a vinyl ester polymer having a high degree of polymerization.

There is further known a polymerization process in which a monomer of vinyl acetate or acrylic acid is subjected to emulsion polymerization at 50° to 90° C. to produce an emulsion, which is then used as seed emulsion for seed-polymerizing ethylene, styrene, acrylic acid, etc. at 50° to 90° C. and at an initiator charge of $5.0 \times 10^{-4}$ to $5.0 \times 10^{-3}$ mol per unit volume (1 liter) of reactant liquid charge (Japanese Patent Application Laid-Open No. 103489/1979). The process, however, is incapable of producing a vinyl ester polymer having a high degree of polymerization because of a large amount of initiator charge required and a high polymerization temperature.

SUMMARY OF THE INVENTION

As a result of intensive research and investigation made by the present inventors in order to overcome the disadvantages of the above-mentioned prior arts, it has been found that vinyl ester polymer having a higher degree of polymerization than that by the conventional process is obtained by a process wherein vinyl ester is subjected to seed polymerization by using vinyl ester polymer emulsion as the seed emulsion under the conditions which control the charge of a water-soluble initiator per unit volume of reactant liquid charge and the charge of the water-soluble initiator per one particle of vinyl ester polymer particles in the seed emulsion within a prescribed range.

It is an object of the present invention to provide a process capable of producing vinyl ester polymer with ease on an industrial scale.

It is another object of the present invention to provide a process capable of producing vinyl ester polymer having a high degree of polymerization at a high efficiency.

It is still another object of the present invention to provide a process capable of producing vinyl ester polymer having a high degree of polymerization and a high purity free from an emulsifier at a high efficiency.

It is a further object of the present invention to provide a process capable of producing vinyl alcohol polymer having a high degree of polymerization or said polymer having a high degree of polymerization and a high purity free from an emulsifier at a high efficiency.

It is a still further object of the present invention to provide a process capable of producing vinyl ester polymer emulsion well suited to the use as seed emulsion in seed polymerization of vinyl ester at a high efficiency.

In a first aspect of the present invention, there is provided a process for producing a vinyl ester polymer characterized in that a vinyl ester is subjected to seed polymerization by using a vinyl ester polymer emulsion as a seed emulsion under the conditions in which the charge of a water-soluble initiator per unit volume (1 liter) of a reactant liquid charge is in the range of $1 \times 10^{-8}$ to $2 \times 10^{-4}$ mol, and at the same time, the charge of the water-soluble initiator per one particle of the vinyl ester polymer particles present in the seed emulsion is in the range of $1 \times 10^{-28}$ to $1 \times 10^{-20}$ mol per particle.

In another aspect of the present invention, there is provided a process for producing a vinyl ester polymer characterized by subjecting a vinyl ester to emulsion polymerization under reduced pressure.

In still another aspect of the present invention, there is provided a process for producing a vinyl ester polymer characterized by subjecting a vinyl ester to emulsion polymerization at $-60°$ to $40°$ C. by the use of a vinyl alcohol polymer as a dispersant.

In a further aspect of the present invention, there is provided a process for producing a vinyl alcohol polymer characterized by hydrolyzing the vinyl ester polymer obtained by the above-mentioned process.

In a still further aspect of the present invention, there is provided a process for producing a vinyl ester polymer emulsion characterized by subjecting a vinyl ester to emulsion polymerization at $-60°$ to $40°$ C. by using 0.5 to 20 parts by weight of the vinyl ester based on 100 parts by weight of a dispersion medium.

DESCRIPTION OF THE PREFERRED EMBODIMENT

Firstly, the process for producing a vinyl ester polymer emulsion well suited to the use as a seed emulsion in seed polymerization of a vinyl ester will be described hereunder.

As described hereinbefore, the process for producing a vinyl ester polymer emulsion is characterized by subjecting a vinyl ester to emulsion polymerization at $-60°$ to $40°$ C. by using 0.5 to 20 parts by weight of the vinyl ester based on 100 parts by weight of a dispersion medium. The polymerization temperature in the emulsion polymerization of a vinyl ester is preferably as low as possible to suppress chain transfer. However, since the growth rate constant decreases with lowering of temperature, a too low polymerization temperature raises such problems as decrease in polymerization rate, susceptibility to oxygen. Accordingly, the polymerization temperature needs to be $-60°$ to $40°$ C., and is desirably $-50°$ to $40°$ C., more desirably $-40°$ to $40°$ C., particularly desirably $-30°$ to $40°$ C., and most desirably $-30°$ to $35°$ C.

When the polymerization temperature is set at $0°$ C. or lower, antifreezing measures are required to prevent the aqueous phase as the dispersion medium from freezing. Therefore, it is necessary to add to the aqueous phase a freezing point depressant such as a water-soluble alcohol, glycol, glycerol, dimethyl sulfoxide, inorganic salt or the like. Specific examples of freezing point depressants include methanol, ethanol, propanol, t-butanol, ethylene glycol, glycerol, dimethyl sulfoxide, lithium chloride, sodium chloride, potassium chloride, etc. Taking into consideration the miscibility with the dispersant such as an emulsifier, vinyl alcohol polymer, etc., influence upon emulsion stability, post-treatment after polymerization, hydrolysis reaction of the vinyl ester polymer and the like, most desirable are methanol and a dimethyl sulfoxide among them. The amount of a freezing point depressant varies depending upon the polymerization temperature, but the ratio by weight of water to freezing point depressant is preferably 100/0 to 50/50, more preferably 100/0 to 60/40.

The amount of a vinyl ester is 0.5 to 20 parts by weight based on 100 parts by weight of a dispersion medium, preferably 1.0 to 10 parts, particularly preferably 1.0 to 6.0 parts each by weight. When the amount of the vinyl ester is less than 0.5 parts by weight, the average degree of polymerization of the vinyl ester polymer thus obtained is only several hundreds at the highest, making it impossible to obtain the objective vinyl ester polymer having a high degree of polymerization. On the other hand, when the above amount exceeds 20 parts by weight, it is impossible to obtain the vinyl ester polymer emulsion having numerous particles with a small size which is best suited to the use as a seed emulsion in the seed polymerization of the vinyl ester.

The dispersants used in the foregoing emulsion polymerization are not particularly limited so long as they are water-soluble, but preferable among them is an emulsifier or a vinyl alcohol polymer or a dispersant which is soluble in the system at a temperature of $-60°$ to $40°$ C. under the condition of the ratio by weight of water to a freezing point depressant being in the range of 100/0 to 50/50, and is capable of stabilizing the emulsion formed to maintain emulsion conditions.

As the emulsifier which meets the above-mentioned requirements, a nonionic emulsifier, nonionic-anionic emulsifier and anionic emulsifier are preferably used. Nonionic emulsifiers are exemplified by polyoxyethylene alkyl ether, polyoxyethylene alkylphenyl ether, polyoxyethylene alkyl ether, and polyoxyethylene sorbitan alkyl ester. Nonionic-anionic emulsifiers are exemplified by polyoxyethylene alkylphenyl ether sulfate, polyoxyethylene alkyl ether sulfate, and polyoxyethylene alkyl ether phosphate. Anionic emulsifiers are exemplified by sulfate of higher alcohol, alkyl allyl sulfonate, phosphate of aliphatic alcohol, etc. The foregoing emulsifier is used alone or in combination with one another. The amount of the emulsifier to be added to the polymerization system ($W_1$) varies depending upon the amount of the vinyl ester, but preferably satisfies the following formula:

$$\frac{(Mw) \times (A_1)}{(Am) \times 100} \times 10 \leq W_1 \leq \frac{(Mw) \times (A_1)}{(Am) \times 100} \times 500$$

where,

Mw: molecular weight of emulsifier
$A_1$: total surface area of particles in emulsion
Am: area occupied by emulsifier molecules Setting $B_1 = [(Mw) \times (A_1)]/[(Am) \times 100]$, the amount of the emulsifier ($W_1$) is preferably $W_1 = (10 \times B_1)$ to $(500 \times B_1)$, more preferably $W_1 = (10 \times B_1)$ to $(300 \times B_1)$, particularly preferably $W_1 = (15 \times B_1)$ to $(250 \times B_1)$. When the amount of emulsifier ($W_1$) is less than $(10 \times B_1)$, it becomes difficult to maintain the particles of vinyl ester polymer in the emulsion under a stable condition, causing coagulation of the particles as the case may be. On the other hand, when $W_1$ is more than $(500 \times B_1)$, the emulsifier becomes excessive, sometimes forming new particles in the case of seed polymerization of vinyl ester by the use of the obtained vinyl ester polymer emulsion as the seed emulsion even after the vinyl ester has allowed the vinyl ester polymer particles in the seed emulsion to swell.

The vinyl alcohol polymer to be used as a dispersant is not particularly limited, and there can be used polyvinyl alcohol composed of vinyl alcohol units alone, copolymer comprising vinyl alcohol units, block copolymer comprising polyvinyl alcohol as one segment, and the like. The degree of hydrolysis of vinyl alcohol polymer is usually 40 to 100 mol %, preferably 60 to 100 mol %. The average degree of polymerization for vinyl alcohol polymer is not particularly limited, but is preferably 50 to 30,000, particularly preferably 100 to 20,000 because of its easy availability. The aforementioned vinyl alcohol polymer is used alone or in combination with one another. The amount of the vinyl alcohol polymer to be added to polymerization system varies depending upon the amount of the vinyl ester, but generally is 0.1 to 10 parts by weight based or 100 parts by weight of dispersion medium, desirably 0.2 to 6 parts by weight, particularly desirably 0.3 to 4 parts by weight. When the amount of the vinyl alcohol polymer is less than 0.1 parts by weight, it becomes difficult to maintain the vinyl eater polymer particles in the emulsion under a stable condition, causing coagulation of the particles as the case may be. On the contrary, when the amount of the vinyl alcohol polymer exceeds 10 parts by weight, the polymer becomes excessive, sometime forming new particles in the case of seed polymerization of vinyl ester by the use of the obtained vinyl ester polymer emulsion as the seed emulsion even after the vinyl ester has allowed the vinyl ester polymer particles in the seed emulsion to swell.

As for the initiator to be used in the emulsion polymerization of the present invention, a water-soluble redox initiator which effectively generates radicals particularly at a low temperature is most effectively used.

The water-soluble redox initiator used in the present invention is composed of:

(a) At least one oxidative substance selected from hydroperoxide, peroxide, or peracid ester;
(b) Metal ion capable of transferring one electron; and
(c) Reducing substance.

The components (a) and (b) are used in combination with each other, or components (a), (b) and (c) are used in combination with one another. Examples of oxidative substance (a) include hydrogen peroxide, cumene hydroperoxide, t-butyl hydroperoxide, persulfate (K, Na, or ammonium salt), t-butyl peracetate, and t-butyl perbenzoate. Examples of metal ion (b) include $Fe^{2+}$, $Cr^{2+}$, $V^{2+}$, $Ti^{3+}$, $Co^{2+}$, and $Cu^+$. Examples of reducing substance (c) include Rongalite and l-ascorbic acid. Preferred examples of (a) are hydrogen peroxide, persulfate (K, Na or ammonium salt), and cumene hydroperoxide; a preferred example of (b) is $Fe^{2+}$; and a preferred example of (c) is Rongalite.

In the case of above-mentioned initiator being used during polymerization, it is preferable that the amount of (b) or the total amount of (b) and (c) is always present in sufficient excess compared with the amount of (a) in view of adjusting the rate of polymerization and conversion to polymer. However, each of the amount of (a), (b) and (c) is not specifically limited.

In the emulsion polymerization of vinyl ester polymer emulsion according to the present invention which has been described hereinbefore, the concentration of radical in the polymerization system is low as compared with the ordinary emulsion polymerization at a high temperature, and therefore, the system is susceptible to oxygen and impurities in the system. Such being the case, special care should be taken against the removal of oxygen from the system prior to the start of polymerization, and further, the entrance of oxygen into the system in the course of polymerization. For the aforementioned reason, each of water, freezing point depressant and vinyl ester to be used in the present invention should be completely deoxygenated prior to use. In addition, it is preferable that the atmosphere in the polymerization system be replaced with nitrogen or argon gas of 99.9% or more, desirably 99.99% or more in purity. The vinyl ester, etc. to be used in the polymerization system should be purified in the usual way prior to use.

The vinyl ester to be used in the present invention includes vinyl formate, vinyl acetate, vinyl propionate, vinyl valerate, vinyl caprate, vinyl laurate, vinyl stearate, vinyl benzoate, vinyl pivalate, vinyl versatate, etc. Among them, vinyl acetate is particularly preferable for the final production of vinyl alcohol polymer.

The foregoing vinyl ester may be copolymerized with a copolymerizable monomer. Examples of such copolymerizable monomers include olefin such as ethylene, propylene, 1-butene, isobutene, etc.; acrylic acid and salt thereof; acrylic ester such as methyl acrylate, ethyl acrylate, n-propyl acrylate, isopropyl acrylate. n-butyl acrylate, isobutyl acrylate, tert-butyl acrylate, 2-ethylhexyl acrylate, dodecyl acrylate, octadecyl acrylate, etc.; methacrylic acid and salt thereof; methacrylic ester such as methyl methacrylate, ethyl methacrylate, n-propyl methacrylate, isopropyl methacrylate, n-butyl methacrylate, isobutyl methacrylate, tert-butyl methacrylate, 2-ethylhexyl methacrylate, dodecyl methacrylate, octadecyl methacrylate, etc.; acrylamide; acrylamide derivative such as N-methyl acrylamide, N-ethyl acrylamide, N,N-dimethyl acrylamide, diacetone acrylamide, acrylamide propanesulfonic acid and salt thereof, acrylamide propyldimethylamine, salt or quarternary salt thereof, N-methylol methacrylamide and derivative thereof, etc.; methacrylamide; methacrylamide derivative such as N-methyl methyl methacrylamide, N-ethyl methacrylamide, methacrylamide propanesulforic acid and salt thereof, methacrylamide propyldimethylamine, salt or quarternary salt thereof, N-methylol methacrylamide and derivative thereof, etc.; vinyl ether such as methyl vinyl ether, ethyl vinyl ether, n-propyl vinyl ether, isopropyl vinyl ether, n-butyl vinyl ether, isobutyl vinyl ether, tert-butyl vinyl ether, dodecyl vinyl ether, stearyl vinyl ether, etc.; nitrile such as acrylonitrile, methacrylonitrile, etc.; halogenated vinyl such as vinyl chloride, vinylidene chloride, vinyl fluoride, vinylidene fluoride, etc.; allyl compound such as allyl acetate, allyl chloride, etc.; maleic acid, and salt or ester thereof; itaconic acid, and salt or ester thereof; vinylsilyl compound such as vinyl trimethoxy silane etc.; and isopropenyl acetate, etc.

Conversion to polymer in the emulsion polymerization according to the present invention is an important factor since it influences degree of polymerization, and is usually 5 to 90%, preferably 10 to 70%, more preferably 20 to 60%. Polymerization time is not particularly limited, but that of 5 hours or longer is not desirable from the viewpoint of operation.

Furthermore, importance is also attached to the average particle diameter as well as the number of the particles of the vinyl ester polymer in the emulsion obtained by low temperature emulsion polymerization according to the present invention. The reason for the above is that the average particle diameter and the number of the particles have a pronounced influence upon the degree of polymerization of the vinyl alcohol polymer and vinyl ester polymer obtained by the seed polymerization of vinyl ester by the use of the vinyl ester polymer emulsion as the seed emulsion.

The average particle diameter of vinyl ester polymer particles in the vinyl ester polymer emulsion according to the present invention is preferable 0.005 to 0.5 $\mu$m.

When an emulsifier is used as a dispersant, the average particle diameter of a vinyl ester polymer is preferably 0.005 to 0.3 $\mu$m, more preferably 0.01 to 0.25 $\mu$m. An emulsion having an average particle diameter of less than 0.005 $\mu$m can be produced provided that an extremely excessive amount of an emulsifier is used, which however, is undesirable because the use of such excessive amount of emulsifier fails to attain the object of the present invention. On the other hand, an emulsion having an average particle diameter of more than 0.3 $\mu$m is undesirable, because it causes decrease in the number of particles as well as bulkiness of the particles of vinyl ester polymer in the seed polymerization.

In the case where a vinyl alcohol polymer is used as a dispersant, the average particle diameter of a vinyl ester polymer is preferable 0.01 to 0.5 $\mu$m, more preferably 0.02 to 0.3 $\mu$m. An emulsion having an average particle diameter of less than 0.01 $\mu$m can be produced provided that an extremely excessive amount of a vinyl alcohol polymer is employed, which however, is undesirable because the use of such excessive amount of vinyl alcohol polymer fails to attain the object of the present invention. On the contrary, an emulsion having an average particle diameter of more than 0.5 $\mu$m is unfavorable, because it results in decrease in the number of particles as well as bulkiness of the particles of vinyl ester polymer in the seed polymerization.

In the present invention, the number of vinyl ester polymer particles per unit volume (1 ml) of vinyl ester polymer emulsion is preferably $10^{12}$ to $10^{16}$ per ml, more preferably $10^{13}$ to $5\times10^{15}$ per ml. When the number of the particles is less than $10^{12}$ ml, new particles are formed or the rate of polymerization is lowered in the course of seed polymerization, thus resulting in undesirable performance.

According to the above-mentioned process, there is obtained a vinyl ester polymer emulsion which is given a numerous number of small-size particles per unit volume of emulsion and particularly suited for use as a seed emulsion in seed polymerization of the vinyl ester polymer. Such emulsion have never been obtained by any of the conventional process.

A vinyl ester polymer emulsion obtained by the process according to the present invention can be used as such, but the characteristic features thereof are sufficiently exhibited when used as a seed emulsion for the seed polymerization of vinyl ester in relation to the production of a vinyl ester polymer and vinyl alcohol polymer each having a high degree of polymerization.

In the following, a process for producing a vinyl ester polymer by means of seed polymerization will be explained in detail.

The process for producing a vinyl ester polymer according to the present invention is characterized in that a vinyl ester is subjected to seed polymerization by the use of a vinyl ester polymer emulsion as a seed emulsion under the conditions in which a charge of a water-soluble initiator per unit volume (1 liter) of reactant liquid charge is set at $1\times10^{-8}$ to $2\times10^{-4}$ mol, and also the charge of the water-soluble initiator per one particle of vinyl ester polymer particles in the seed emulsion is set at $1\times10^{-28}$ to $1\times10^{-20}$ mol per particle.

A vinyl ester polymer emulsion to be used as a seed emulsion is not particularly limited, but is preferably the one obtained by the process as mentioned above, and particularly preferably the one obtained by the use of a vinyl alcohol polymer as a dispersant among them.

In the seed polymerization according to the present invention, there are added to the seed emulsion as required, a vinyl ester, water, a freezing point depressant, the components (b) and (c) as mentioned above, and a dispersant.

A vinyl ester to be added may be the same as or different from that used during the production of the seed emulsion. Also the kinds of vinyl ester are exemplified by those described in the foregoing vinyl ester polymer emulsions. In the case of a vinyl alcohol polymer to be obtained, vinyl acetate is particularly preferable among all. There is no problem at all for copolymerization with the above-mentioned monomer copolymerizable with the vinyl ester.

As for the amount of the vinyl ester to be added, the ratio by weight of (A) vinyl ester polymer in the seed emulsion to the total amount of (A) vinyl ester polymer and (B) vinyl ester at the time of beginning the seed polymerization is preferably 0.01 to 20%, [(A)/((A)+(B))×100=0.01 to 20] for the purpose of obtaining a vinyl ester polymer having a high degree of polymerization. The ratio by weight is more preferably 0.05 to 20%, most preferably 0.05 to 10%. When the ratio exceeds 20%, it becomes difficult to obtain a vinyl ester polymer having a high degree of polymerization because of considerable influence exerted by the vinyl ester polymer in the seed emulsion.

When the polymerization temperature is set at 0° C. or lower, antifreezing measures are required to prevent the aqueous phase as the dispersion medium from freezing, and an freezing point depressant which has been exemplified in the description of the process for producing vinyl ester polymer is added to the system for this purpose. The amount of the freezing point depressant to be added varies depending upon the polymerization temperature, but the ratio by weight of water to freezing point depressant is preferably 100/0 to 50/50, more preferably 100/0 to 60/40.

As for the amount of water to be added, the ratio by weight of water to seed emulsion is 300% or less, preferably 200% or less. The ratio exceeding 300% is undesirable, because the number of particles of the seed emulsion decreases causing decrease in the average rate of polymerization during the seed polymerization as well decrease as in the degree of polymerization of the vinyl ester polymer obtained.

The dispersant to be used in the seed polymerization is not limited so long as it is a water-soluble dispersant, but an emulsifier and a vinyl alcohol polymer are preferable among them. Also preferable is a dispersant which is soluble in the system at −60° to 40° C. under the condition of the ratio by weight of water to freezing point depressant being in the range of 100/0 to 50/50, and is capable of stabilizing the seed emulsion to maintain an stable emulsion state.

As an emulsifier to be used as a dispersant, there can be employed a nonionic emulsifier, nonionic-anionic emulsifier and anionic emulsifier as described in the foregoing explanation of the process for producing vinyl ester polymer emulsion. As for the amount of emulsifier, it is preferable that the amount be selected so that the ratio of the area occupied by adsorbing emulsifier to the total surface area of vinyl ester polymer particles in the emulsion before seed polymerization ranges from 10 to 200%.

In the seed polymerization according to the present invention, it is desirable that the amount of emulsifier ($W_2$) meets the following formula:

$$\frac{(Mw) \times (A_2)}{(Am) \times 100} \times 10 \leq W_2 \leq \frac{(Mw) \times (A_2)}{(Am) \times 100} \times 200$$

where,
Mw: molecular weight of emulsifier
$A_2$: total surface area of particles in emulsion
Am: area occupied by emulsifier molecules Setting $B_2=[(Mw)\times(A_2)]/[(Am)\times 100]$, the amount of emulsifier ($W_2$) is preferably $(10\times B_2)$ to $(200\times B_2)$, more preferably $(20\times B_2)$ to $(150\times B_2)$. It is particularly preferable that the emulsifier be continuously added to the polymerization system during seed polymerization process. However, the emulsifier may be intermittently added to the system so long as the amount of emulsifier falls under the aforementioned range. When the amount of emulsifier is less than $(10\times B_2)$, emulsion stability is lost, making it impossible to obtain a vinyl ester polymer having a high degree of polymerization. On the other hand, when the amount of emulsifier exceeds $(200\times B_2)$, it follows that an excessive emulsifier exists in the polymerization system, and new particles are formed, causing an undesirable conditions for producing a vinyl ester polymer having a high degree of polymerization.

As for a vinyl alcohol polymer to be used as a dispersant, there can be used vinyl alcohol polymers mentioned in the description of a process for producing a vinyl ester polymer emulsion. The amount of a vinyl alcohol polymer to be added to the polymerization system varies depending upon the usage of a vinyl ester, but is usually 0.5 to 30 parts by weight based on 100 parts by weight of a dispersion medium, preferably 0.5 to 20 parts by weight, more desirably 1.0 to 10 parts by weight. It is particularly preferred to continuously add the vinyl alcohol polymer to the polymerizing system during seed polymerization process. However, the polymer may be intermittently added to the system so long as the amount of the polymer falls within the foregoing range. When the amount of the vinyl alcohol polymer is less than 0.5 parts by weight, it becomes difficult to maintain the vinyl ester polymer particles in the emulsion under stable conditions, sometimes causing coagulation of the polymer particles, thus making it impossible to obtain a vinyl ester polymer having a high degree of polymerization. Conversely, the amount of the vinyl alcohol polymer exceeding 30 parts by weight is undesirable for the purpose of producing a vinyl ester polymer having a high degree of polymerization, since the viscosity of the polymerization system is sometimes made too high, uniform proceeding of polymerization is made impossible, removal of polymerization heat becomes insufficient, or new particles are formed.

The order of the addition of a vinyl ester, water, a freezing point depressant, components (b) and (c) and a dispersant to a seed emulsion may be optionally selected so long as the seed emulsion is kept stable.

For the purpose of obtaining a vinyl ester polymer having a high degree of polymerization, seed polymerization temperature should be −60° to 60° C., desirably −60° to 40° C., more desirably −50° to 40° C., still more desirably −40° to 40° C., further desirably −30° to 40° C., still further desirably −30° to 30° C. When polymerization temperature is set at 0° C. or lower, a freezing point depressant is needed for the purpose of anti-freezing as already described hereinbefore.

In what follows, a water-soluble initiator to be used in seed polymerization will be described in detail. As a water-soluble initiator, a redox initiator is preferably used. As stated in the description of the process for producing a vinyl ester polymer emulsion, there is used a water-soluble redox initiator consisting of the components (a), (b) and (c). It is necessary that the charge of a water-soluble initiator per unit volume (1 liter) of reactant liquid charge is $1\times 10^{-8}$ to $2\times 10^{-4}$ mol, and the charge of the water-soluble initiator per particle of vinyl ester polymer particles is $1\times 10^{-28}$ to $1\times 10^{-20}$ mol/particle.

In the case where a redox initiator consisting of the components (a), (b) and (c) as stated in the description of the process for producing a vinyl ester polymer emulsion is used as an initiator in the present invention, by the term "charge of a water-soluble initiator" is meant the charge of the component (a), that is, an oxidative substance.

The charge of a water-soluble initiator per unit volume (1 liter) of reactant liquid charge should be $1.0\times 10^{-8}$ to $2\times 10^{-4}$ mol, desirably $5\times 10^{-8}$ to $1\times 10^{-4}$ mol, more desirably $1\times 10^{-7}$ to $1\times 10^{-4}$ mol. When the charge thereof is less than $1.0\times 10^{-8}$ mol, the rate of polymerization decreases and the advantage of the emulsion polymerization is impaired. Conversely, when the charge thereof exceeds $2 \times 10^{-4}$ mol, numerous radicals exist in the emulsion particles originating from the seed emulsion particles making it impossible to obtain vinyl ester polymer and vinyl alcohol polymer each having a high degree of polymerization.

The charge of a water-soluble initiator per one particle of vinyl ester polymer particles in the seed emulsion should be $1 \times 10^{-28}$ to $1 \times 10^{-20}$ mol, desirably $1 \times 10^{-27}$ to $5 \times 10^{-21}$ mol, more desirably $5 \times 10^{-27}$ to $1 \times 10^{-21}$ mol.

In more detail of a water-soluble initiator, the rate of radical generation varies depending on the type of initiator used, and in the case where a redox initiator consisting of components (a), (b) and (c) is employed, radicals are generated by the addition of component (a) and the rate of radical disappearance depends on polymerization temperature and the vinyl ester monomer in the vinyl ester polymer particles. It is preferable for the purpose of obtaining a vinyl ester polymer and vinyl alcohol polymer each having a high degree of polymerization in the seed polymerization according to the present invention that the number of radicals (Y) existing per one particle of vinyl ester polymer particles in the seed emulsion and per unit time (sec) is $6 \times 10^{-7}$ to 0.12, desirably $3 \times 10^{-7}$ to 0.12, more desirably $6 \times 10^{-6}$ to 0.12.

$$Y = \frac{6.0 \times 10^{20} \times [(a)]}{N}$$

where [(a)]; charge of water-soluble initiator per unit volume (1 liter) of reactant liquid charge and per unit time (1 sec) [mol/l/sec]

N; number of particles of vinyl ester polymer per unit volume (1 ml) of seed emulsion [ml$^{-1}$]

It is important in the application of the redox initiator that the amount of component (b) or the total amount of components (b) and (c) always exists in the polymerization system during polymerization in sufficient excess against the amount of component (a); otherwise, the component (a) remains in the system after polymerization, and when the system temperature is raised in the process of post-treatment, etc., an undesirable polymerization reaction takes place resulting in failure to obtain the aimed polymer having a high degree of polymerization. Taking into consideration the above possible problem, it is desirable in adding the components (a), (b) and (c) to the polymerization system that the total amount of (b) alone or (b)+(c) be added to the system prior to the start of seed polymerization and that the component (a) be added after some delay.

As for the method of adding the components (b) and (c), there are available a method wherein the components (b) and (c) are previously added in excess in the case of producing a seed emulsion, and a method of adding both the components at the time of starting seed polymerization, either of which may be adopted in the process of the present invention.

Importance should be attached to the mutual concentration ratio among the components (a), (b) and (c) as well as to the method of adding, since these factors exert great influence on the degrees of polymerization of both vinyl ester polymer and vinyl alcohol polymer as is the case with the seed emulsion production.

Since the seed polymerization according to the present invention is effected at a low temperature, sufficient care should be exercised against the removal of oxygen from the system and the entrance thereof into the system during polymerization as is the case with the emulsion production.

The present invention provides processes for producing a vinyl ester polymer and vinyl alcohol polymer each having a high degree of polymerization. The conversion to polymer in the seed polymerization according to the present invention is an important factor since it influences the degree of polymerization, and is usually 10 to 95%, desirably 20 to 90%, more desirably from 20.0% to 78.9%, most desirably 30 to 78.9%.

The polymerization time is not particularly limited, but is preferable 1 to 15 hours. Having an influence on the degree of polymerization, the average rate of polymerization is also an important factor depending on the number of particles in the emulsion, and is desirably 2 to 25%/hr, more desirably 30 to 20%/hr.

Having influences on both the degree of polymerization and the rate of polymerization, the number of vinyl ester polymer particles during and after the seed polymerization is also an important factor, and is preferably $10^8$ to $10^{16}$ per unit volume (1 ml) of the seed emulsion. When an emulsifier is used as a dispersant, the above-mentioned number is desirably $10^{12}$ to $10^{16}$/ml, more desirably $10^{13}$ to $5 \times 10^{15}$/ml, and in the case where a vinyl alcohol polymer is used as a dispersant, the number is desirably $10^8$ to $10^{15}$/ml, more desirably $10^{10}$ to $5 \times 10^{14}$/ml. When the number of particles is less than $10^{12}$/ml in the case of the former, or less than $10^8$/ml in the case of the latter, the rate of polymerization is extremely lowered, losing the advantage of emulsion polymerization.

Since the present invention is intended for allowing seed emulsion particles to grow as such without coagulation, the average particle size of vinyl ester polymer particles varies depending upon the average particle size of the seed emulsion to be used, and is not particularly limited, but is desirably 10 μm or less, more desirably 5 μm or less.

According to the present invention as compared with the conventional process, a vinyl ester polymer having an average degree of polymerization of 4000 or more, preferably 7000 or more can be produced with ease.

The upper limit of the average degree of polymerization of the vinyl ester polymer obtained according to the present invention is desirably 100,000 more desirably 70,000.

The average degree of polymerization of a vinyl ester polymer as stated herein is expressed by viscosity average degree of polymerization (P) which is obtained by the following formula:

$$P = ([\eta] \times 10^3 / 7.94)^{(1/0.62)}$$

where $[\eta]$ stands for intrinsic viscosity which is measured in acetone at 30° C. for reacetylated polyvinyl acetate after hydrolysis of the vinyl ester polymer.

The above-mentioned description is concerned mainly with the batch-wise seed polymerization, but the seed polymerization according to the present invention is not limited to batch-wise polymerization, but is applicable to continuous polymerization.

Assuming industrial production, the seed polymerization according to the present invention is put into practical application more favorably by continuous process than by batch-wise process.

In the following, the continuous process for seed polymerization will be described. The process according to the present invention can be carried out by means of continuous polymerization process wherein to a reactor are continuously introduced a seed emulsion of vinyl ester polymer, vinyl ester monomer, water, emulsifier, protective colloid, initiator, freezing point depressant, and other polymerization aid as the case may be, and after polymerization, the polymer emulsion is continuously taken out. The above continuous polymerization operation can contribute to the compactness of production plant, product quality stabilization, minimization of scale deposit, and the like.

As the reactor to be used for continuous polymerization process, an agitated reactor, tubular reactor, reactor having an agitating part and tubular part, or any other known type of reactor may be used so long as the continuously added materials are promptly and completely mixed. There can be used in the above case, single agitation type reactor, a plurality of agitation type reactors each connected in series, a looped tubular reactor, a multicompartment type reactor, or the like.

The above-mentioned process and equipment may also be applied to the continuous production of seed emulsion. The equipment to be used for continuous production of seed emulsion may be that completely filled with polymerizing reactant liquid free from space, or that with space formed with nitrogen or argon gas, etc.

The aforementioned description with respect to seed emulsion, vinyl ester monomer, water, emulsifier, protective colloid, initiator, freezing point depressant, etc. to be used for batch-wise process is also applied to continuous process. As for the method of adding, each of the components may be added separately, or after mixing all together, or may be distributed uniformly or nonuniformly depending on the number of reactor/s to feed to each reactor without particular limitation. Such operational factors as polymerization temperature, conversion to polymer, polymerization hour and average degree of polymerization may be selected in the same manner as in the batch-wise seed polymerization described hereinbefore. The average retention time in reaction system is 1.0 to 15.0 hours, desirably 2.0 to 10 hours, more desirably 2.0 to 8.0 hours.

In the following, the process for effecting emulsion polymerization of vinyl ester under reduced pressure will be described. The conventional emulsion polymerization has heretofore been carried out only under ordinary pressure. Surprisingly, the present inventors have found that it is possible to subject a monomer to emulsion polymerization while boiling the monomer under reduced pressure, which process is excellent in view of removal of polymerization heat and preventing fouling such as scale deposit by means of monomer reflux.

The emulsion polymerization temperature under reduced pressure according to the present invention is 60° C. or lower, desirably 50° C. or lower, more desirably 40° C. or lower.

Since the emulsion polymerization under reduced pressure according to the present invention necessitates monomer reflux, it is preferable to select the conversion to polymer of 90% or lower. A conversion to polymer exceeding 90% may cause decrease in reflux amount, thereby lowering the effect of the present invention.

The emulsion polymerization under reduced pressure according to the present invention is applicable to any of the polymerization processes including conventional emulsion polymerization, emulsion polymerization at low temperature, seed polymerization and continuous emulsion polymerization, and particularly exhibits its effect in the case of high heat release, low temperature, etc. The degree of vacuum to be applied varies depending upon the monomer to be used, polymerization temperature, rate of polymerization, method of polymerization and polymerization equipment, but may be optionally selected so that the monomer boils at ordinary polymerization temperature.

The degree of vacuum to be applied to the emulsion polymerization under reduced pressure according to the present invention is desirably 500 Torr or less, more desirably 350 Torr or less, still more desirably 230 Torr or less. Among the above-mentioned emulsion polymerization conditions, an emulsion polymerization at a temperature of 40° C. or lower and under a degree of vacuum of 230 Torr or less is particularly desirable in the present invention.

The average degree of polymerization of the vinyl ester polymer obtained through the emulsion polymerization under reduced pressure according to the present invention is not specifically limited, but is desirably 1500 or more, more desirably 2500 or more, still more desirably 4000 or more.

The upper limit of the average degree of polymerization of the vinyl ester polymer obtained by emulsion polymerization under reduced pressure according to the present invention is desirably 100,000, more desirably 70,000.

In the following, there is described the process for producing a vinyl ester polymer characterized in that a vinyl ester is subjected to emulsion polymerization at $-60°$ to 40° C. by the use of a vinyl alcohol polymer as a dispersant. This process is not always limited to the seed polymerization as mentioned above, but is based on the use of a vinyl alcohol polymer as a dispersant, enabling to produce a vinyl ester polymer having a high purity and high degree of polymerization as compared with the case where an emulsifier is used as a dispersant. The polymerization temperature is $-60°$ to 40° C., desirably $-50°$ to 40° C., more desirably $-40°$ to 40° C., further desirably $-30°$ to 40° C., still further desirably $-30°$ to 30° C., when a polymerization temperature is set at 0° C. or lower, it is preferable to compound a freezing point depressant into the system as is the case with the seed polymerization as mentioned above. The kinds of vinyl alcohol polymers to be used as a dispersant are same as those described in the seed polymerization.

The amount of a vinyl alcohol polymer to be added to the emulsion polymerization system varies depending upon the amount of a vinyl ester, but is 0.5 to 30 parts by weight based on 100 parts by weight of a dispersion medium, preferably 0.5 to 20 parts by weight, particularly desirably 1.0 to 10 parts by weight. When the amount of the vinyl alcohol polymer is less than 0.5 parts by weight, it becomes difficult to maintain the vinyl ester polymer particles in the emulsion under stable conditions, sometimes causing coagulation of polymer particles. On the other hand, when the amount of the vinyl alcohol polymer exceeds 30 parts by weight, the viscosity of the emulsion polymerization system is sometimes made too high, uniform proceeding of polymerization is made impossible, or removal of polymerization heat becomes insufficient.

The amount of a vinyl ester is 50 to 300 parts by weight based on 100 parts by weight of a dispersion medium, desirably 75 to 280 parts by weight, particularly desirably 100 to 250 parts by weight. The amount of the vinyl ester less than 50 parts by weight is unfavorable from the standpoint of productivity. On the contrary, when the amount exceeds 300 parts by weight, it becomes difficult to maintain the vinyl ester polymer particles in the emulsion under stable conditions, sometimes causing coagulation of polymer particles.

As the polymerization process according to the present invention is put into practice at low temperature, the redox initiator capable of generating radicals at low temperatures is most effectively employed. There can be used the redox initiator as described hereinbefore.

The emulsion polymerization according to the present invention is carried out at a low temperature as compared with the conventional emulsion polymerization, and is susceptible to oxygen and impurities in the system because of low radical concentration. Under such circumstances, sufficient care should be taken against the removal of oxygen from the system prior to the start of polymerization as well as the entrance of oxygen into the system during polymerization as is the case with seed polymerization described hereinbefore. For this reason, each of water, freezing point depressant and vinyl ester to be used in the process of the present invention should be completely deoxygenated prior to use. In addition, it is preferable that the atmosphere in the polymerization system be replaced with nitrogen or argon gas of 99.9% or more, desirably 99.99% or more in purity. The vinyl ester to be used in the polymerization system should be purified in the usual way prior to use.

There are available numerous kinds of vinyl esters in the emulsion polymerization according to the present invention. Specific examples include the vinyl esters as exemplified in the foregoing description on the seed polymerization. Also, the monomers copolymerizable with the vinyl esters as described hereinbefore are usable in the above process.

Having an influence on the degree of polymerization, the convertion to polymer is an important factor, and is usually 10 to 95%, desirably 20 to 90%, more desirably 30 to 85%.

The polymerization time is not particularly limited, but is preferable 1 to 15 hours. Having an influence on the degree of polymerization, the average rate of polymerization is also an important factor depending on the number of particles in the emulsion, and is desirably 2 to 30%/hr, more desirably 3 to 20%/hr.

The average particle diameter of vinyl ester polymer particles varies depending upon the amount of vinyl alcohol polymer added to the system and is not particularly limited, but is desirably less than 10 $\mu$m, more desirably less than 5 $\mu$m.

Having influences on both the degree of polymerization and the rate of polymerization, the number of vinyl ester polymer particles is also an important factor, and is desirably $10^{10}$ to $10^{15}$ per unit volume (ml), more desirably $10^{11}$ to $5 \times 10^{14}$/ml. When the number of particles is less than $10^{10}$/ml, the rate of polymerization is extremely lowered against the purpose of obtaining a vinyl ester polymer and vinyl alcohol polymer each having a high degree of polymerization, resulting in the loss of the advantage of emulsion polymerization.

According to the emulsion polymerization process of the present invention, a vinyl ester polymer having a high purity and a high degree of polymerization can be produced with ease as compared with the case where an emulsifier is employed as a dispersant. The emulsion polymerization process according to the present invention is particularly suited for the production of a vinyl ester polymer having an average degree of polymerization of 4000 or more, preferably 7000 or more.

The upper limit of the average degree of polymerization of the vinyl ester polymer obtained according to the present invention is desirably 100,000, more desirably 70,000.

Lastly, the process for producing a vinyl alcohol polymer will be described.

Needless to say, it is possible to deposit and recover a polymer from the vinyl ester polymer emulsion obtained by the seed polymerization or emulsion polymerization according to the present invention by means of usual solidification or stripping. In the case of producing a vinyl alcohol polymer, however, it is desirable to use the procedure in which a vinyl ester polymer emulsion formed is poured and dissolved in a large amount of methanol or dimethyl sulfoxide containing an inhibitor and unreactive vinyl ester is distilled away to form a solution of the vinyl ester polymer in methanol or dimethyl sulfoxide. The solution thus obtained contains water, and is subjected to alcoholysis by the use of sodium hydroxide, sodium methylate, or sodium ethylate, etc, as a catalyst, or to hydrolysis reaction due to acid decomposition using sulfuric acid, hydrochloric acid, phosphoric acid, etc, as a catalyst to form a vinyl alcohol polymer. There is no limitation to the amount of base catalyst or acid catalyst to be used in hydrolysis reaction, and hydrolysis reaction temperature. The hydrolysis reaction can be carried out in the same manner as the previous method. Having a high degree of polymerization, a vinyl alcohol polymer obtained by the process according to the present invention, when completely hydrolyzed, can be washed with cold water to eliminate such impurities as sodium acetate, emulsifier, initiator, etc. For removing metallic ions, washing with aqueous solution of an acid is effective.

Since no emulsifier is used in the production of vinyl alcohol polymer by means of emulsion polymerization using a vinyl alcohol polymer as a dispersant, the vinyl alcohol polymer thus obtained is of high purity and free from any emulsifier. When further purification is required, it can be washed with water to eliminate such impurities as sodium acetate, initiator, etc. as is the case with the above.

According to the present invention, a vinyl alcohol polymer having an average degree of polymerization of 4000 or more, preferably 7000 or more can be produced more easily than the conventional process.

The upper limit of the average degree of polymerization of the vinyl alcohol polymer obtained according to the present invention is desirably 100,000, more desirably 70,000.

The average degree of polymerization of a vinyl alcohol polymer as stated herein is expressed by viscosity average degree of polymerization (P) which is obtained by the following formula:

$$P = ([\eta] \times 10^3 / 7.94)^{(1/0.62)}$$

where [$\eta$] indicates for intrinsic viscosity which is measured in acetone at 30° C. for reacetylated polyvinyl acetate from said vinyl alcohol polymer.

The process for producing a vinyl ester polymer by seed polymerization and the process for producing a vinyl alcohol polymer using the vinyl ester polymer obtained by said seed polymerization each according to the present invention are each a novel production process which enables a vinyl ester polymer or vinyl alcohol polymer each having a high degree of polymerization as compared with the conventional process and a high purity without containing any emulsifier according to the demand to be produced without any difficulty on an industrial scale.

Although the contributor to the above-mentioned advantage has not yet been elucidated, it is presumed that the existence of seed particles prior to the start of emulsion polymerization of vinyl ester monomer contributes to the growth of the seed particles without producing new particle, thereby making possible to obtain a polymer having a high degree of polymerization.

Furthermore, the process for producing a vinyl ester polymer by means of emulsion polymerization using a vinyl alcohol polymer as a dispersant and the process for producing a vinyl alcohol polymer by the use of the vinyl ester polymer thus obtained are each a novel production process which enables a vinyl ester polymer or vinyl alcohol polymer each having a high degree of polymerization as compared with the conventional process and a high purity free from any emulsifier to be easily produced on an industrial scale. Surprisingly, the film of vinyl alcohol polymer obtained by the above-mentioned process possesses extremely prominent physical properties. The contributor to the advantage has not yet been clarified. However, it is presumed that with regard to low temperature emulsion polymerization using an emulsifier, reaction takes place between the emulsifier and vinyl ester polymer, during polymerization, the emulsifier is surrounded by the polymer or the used emulsifier is mixed in the polymer, thus making it impossible to completely remove the emulsifier from vinyl ester polymer and vinyl alcohol polymer.

The vinyl alcohol polymer obtained by the process according to the present invention is not only utilized as a paper processing agent, textile processing agent, emulsion stabilizer, etc. by virtue of the aforementioned characteristics, but also finds use in the new industrial field such as high tenacity fiber, high durability film, etc., rendering itself highly valuable in the related industrial field.

The present invention is now described in more detail with reference to the following examples, which are not intended to limit the scope of the invention. In the examples, "%" and "part" mean "% by weight" and "parts by weight", respectively.

The average particle diameter of polymer emulsion particles was measured by using a submicron particle analyzer "NICOMP" Model 370(mfg. by Hiac/Rayco Corp.). The number of particles per unit volume was calculated by the following formula from the average particle diameter thus measured and the conversion to polymer:

Number of particles $(ml^{-1}) = 3Mx/4\pi r^3 d$ where M, x, r and d designate weight of monomer (g), conversion to polymer from monomer, average particle diameter of emulsion (cm) and specific gravity of emulsion, respectively. The area occupied by emulsifier molecules was calculated from the experiment on soap solution titration method.

EXAMPLE 1

In a reactor equipped with a stirrer, thermometer, nitrogen inlet and cooling pipe were fed with stirring 1000 parts of deionized water, 30 parts of vinyl acetate, 3.0 parts of polyoxyethylene [POE (40)] nonylphenyl ether ("Nonipol 400", a product of Sanyo Chemical Industries, Ltd.), 0.60 part of Rongalite, and 0.03 part of $FeSO_4 \cdot 7H_2O$. The reactants were boiled for 30 minutes and then cooled to 5° C. while introducing nitrogen. Then 0.024% hydrogen peroxide solution which had been separately prepared by using deaerated deionized water was continuously and uniformly added to the reactants at a rate of 10 parts per hour to initiate polymerization. During the polymerization, the system was sealed with nitrogen gas to prevent oxygen from entering. After 0.2 hour, the polymerization solution assumed blue color, and 0.5 hour later when the conversion to polymer reached 47.8%, the addition of hydrogen peroxide was discontinued, followed by further stirring for 0.5 hour to obtain a conversion to polymer of 56.9%. The average particle diameter of the emulsion thus obtained was measured as 0.047 μm. The number of particles of the polyvinyl acetate per unit volume of the emulsion was calculated as $2.6 \times 10^{14}$ per ml by the use of the average particle diameter measured as above. The amount of 3.0 parts of emulsifier ($W_1$) is expressed by the following formula:

$$\text{Amount of emulsifier } (W_1) = \frac{M_w \times A_1}{A_m \times 100} \times 163$$

where, $M_w$: molecular weight of emulsifier.
$A_1$: total surface area of particles in emulsion.
$A_m$: area occupied by emulsifier molecules.

The emulsion thus obtained was added with 970 parts of vinyl acetate which had been separately boiled for 30 minutes and then cooled to 5° C. while introducing nitrogen, and was adjusted to 5° C. Then 0.010% hydrogen peroxide which had been separately prepared by using deaerated deionized water was added to the mixture at a rate of 10 parts per hour, and further 22% aqueous solution of Nonipol 400 which had been separately prepared by using deaerated deionized water was continuously and uniformly added to the mixture at a rate of 10 parts per hour to initiate polymerization. During the polymerization, the system was sealed with nitrogen gas to prevent oxygen from entering. 4.5 hours later when the conversion to polymer reached 59.6% (the maximum rate of polymerization=17%/hr), the addition of hydrogen peroxide and aqueous solution of Nonipol 400 was discontinued to arrest further polymerization. The average particle diameter of the emulsion thus obtained was measured as 0.26 μm. The number of polyvinyl acetate particles per unit volume of the emulsion was calculated as $5.2 \times 10^{13}$ per ml. The amount of 45 parts of an emulsifier ($W_2$) is expressed by the following equation:

$$\text{Amount of emulsifier } (W_2) = \frac{M_w \times A_2}{A_m \times 100 \times 0.22} \times 111$$

where, $M_w$: molecular weight of emulsifier.
$A_2$: total surface area of particles in emulsion.
$A_m$: area occupied by emulsifier molecules.

The emulsion thus obtained was poured into a solution of one part of hydroquinone monomethyl ether in 70000 parts of methanol at room temperature to dissolve the emulsion with stirring. After dissolution, unreacted vinyl acetate was removed while adding methanol under reduced pressure. Thus there was obtained a methanol solution of polyvinyl acetate (PVAc). A portion of the solution was hydrolyzed at a PVAc concentration of 6%, at an [NaOH]/[VAc] molar ratio of 0.1 and at 40° C. 0.1 part of the resulting polyvinyl alcohol (PVA) was reacetylated with occasional stirring in a mixed liquid composed of 8 parts of acetic anhydride and 2 parts of pyridine at 105° C. for 20 hours. The resulting polyvinyl acetate was purified by repeated reprecipitation with a mixed solvent of acetone and ether and with a mixed solvent of acetone and water. The viscosity average degree of the polymerization of the purified polyvinyl acetate as obtained from the intrinsic viscosity thereof in acetone at 30° C. was 22,600.

Thereafter, the methanol solution of polyvinyl acetate was hydrolyzed at a PVAc concentration of 6%, at an [NaOH]/[VAc] molar ratio of 0.15 and at 40° C. After removal of the liquid, the resulting PVA was added with the same amount of NaOH as used for hydrolysis, and was immersed in methanol. Thus rehydrolysis was accomplished at 40° C. for 24 hours. The residual NaOH in PVA was neutralized with 1N sulfuric acid and the resulting PVA was washed with 0.0001N sulfuric acid and then washed repeatedly with deionized water and finally washed with methanol. After removal of the liquid, the purified PVA was dried at 40° C. and was found to have a degree of hydrolysis of 99.8 mol %. The PVA was reacetylated under the same conditions as mentioned above and the resulting polyvinyl acetate was purified by reprecipitation in the same manners as mentioned above. The viscosity average degree of the polymerization of the purified polyvinyl acetate as obtained from the intrinsic viscosity thereof in acetone at 30° C. was 22,600.

In the above-mentioned seed polymerization, the charge A (mol/l) of the water-soluble initiator (hydrogen peroxide) per unit volume (1 liter) of reactant liquid charge was $6.15 \times 10^{-5}$, and the charge B (mol/particle) of the water-soluble initiator (hydrogen peroxide) per one particle of vinyl ester polymer particles in seed emulsion was $2.36 \times 10^{-22}$. The charge C (mol/l/sec) of the water-soluble initiator (hydrogen peroxide) per unit volume (1 liter) of reactant liquid charge and per unit time (1 sec) was $3.79 \times 10^{-9}$. In addition, Y value as defined by the following formula was $8.76 \times 10^{-3}$.

$$Y \text{ value} = \frac{6.0 \times 10^{20} \times \text{charge } C}{N}$$

where

N: number of particles of vinyl ester polymer per unit volume (1 ml) of seed emulsion [ml$^{-1}$]

charge C: charge of water soluble initiator per unit volume (1 liter) of reactant liquid charge and per unit time (1 sec) [mol/l/sec]

Comparative Example 1

In a same reactor as in Example 1 were fed with stirring 1000 parts of deionized water, 1000 parts of vinyl acetate, 30 parts of polyoxyethylene [POE (40)] nonylphenyl ether ("Nonipol 400", a product of Sanyo Chemical Industries, Ltd.), 1.25 parts of Rongalite, and 0.12 part of $FeSO_4 \cdot 7 H_2O$. The reactants were boiled for 30 minutes and then cooled to 5° C. while introducing nitrogen. Then 0.075% hydrogen peroxide solution which had been separately prepared by using deaerated deionized water was continuously and uniformly added to the reactants at a rate of 10 parts per hour to initiate polymerization. During the polymerization, the system was sealed with nitrogen gas to prevent oxygen from entering in the same manner as in Example 1. 3.5 hours later when the conversion to polymer reached 60.2% (the maximum rate of polymerization = 17.2%/hr), the addition of hydrogen peroxide was discontinued to arrest further polymerization. The average particle diameter of the emulsion thus obtained was measured as 0.28 μm. The number of particles of the polyvinyl acetate per unit volume of the emulsion was $4.2 \times 10^{13}$ per ml. The amount of 30 parts of emulsifier ($W_1$) is expressed by the following formula:

$$\text{Amount of emulsifier} = \frac{M_w \times A_1}{A_m \times 100} \times 275$$

where the definitions of $M_w$, $A_1$ and $A_m$ are the same as before.

The emulsion thus obtained was poured into a solution of one part of hydroquinone monomethyl ether in 25000 parts of methanol at room temperature to dissolve the emulsion with stirring. After dissolution, unreacted vinyl acetate was removed in the same manner as in Example 1. Thus there was obtained a methanol solution of polyvinyl acetate. A portion of the solution was subjected to hydrolysis and reacetylation reactions under the same conditions as Example 1 to obtain purified polyvinyl acetate. The viscosity average degree of polymerization of the purified polyvinyl acetate as obtained from the intrinsic viscosity thereof in acetone at 30° C. was 14,000.

Thereafter, the methanol solution of polyvinyl acetate was hydrolyzed, rehydrolyzed, neutralized, washed and then dried under the same conditions as in Example 1 to obtain purified PVA having a degree of hydrolysis of 99.9 mol %.

The PVA was reacetylated under the same conditions as mentioned above, and the resultant polyvinyl acetate was purified by reprecipitation in the same manners as mentioned above. The viscosity average degree of polymerization of the purified polyvinyl acetate as obtained from the intrinsic viscosity thereof in acetone at 30° C. was 14,000.

It can be understood from the above results that according to the present invention, polyvinyl acetate and PVA each having a markedly high viscosity average degree of polymerization of 22,600 are easily obtained as shown in Example 1 in which seed polymerization is effected at 5° C. even under the almost same polymerization conditions as in the Comparative Example 1, in which emulsion polymerization is performed at 5° C., resulting in the above polymers having a viscosity average degree of polymerization of only 14,000.

EXAMPLE 2

In the same reactor as used in Example 1 were fed 1000 parts of deionized water, 100 parts of vinyl acetate, 12.5 parts of an 80% aqueous solution of sodium polyoxyethylene [POE (35)] nonyl phenyl ether sulfate (Eleminol ES-70, a product of Sanyo Chemical Industries, Ltd.), 0.40 part of Rongalite and 0.02 part of $FeSO_4 \cdot 7 H_2O$. The reactants were boiled and cooled to 40°

C. Then, a 0.008% aqueous solution of potassium persulfate which had been separately prepared by using deaerated deionized water was continuously and uniformly added to the reactants at a rate of 5 parts per hour to initiate polymerization. After 0.2 hour, when the conversion to polymer reached 30.6%, the addition of the aqueous solution of potassium persulfate was discontinued, and the stirring was further conducted for 0.8 hour at a temperature of 40° C. to give a conversion to polymer of 68.2%. The emulsion thus obtained had an average particle diameter of 0.097 μm and the number of particles of the polyvinyl acetate per unit volume of the emulsion of $1.2 \times 10^{14}$/ml. The amount of 12.5 parts of an emulsifier is expressed by the following formula:

$$\text{Amount of emulsifier } (W_1) = \frac{M_w \times A_1}{A_m \times 100 \times 0.80} \times 462$$

where $M_w$, $A_1$ and $A_m$ have the same meanings as defined above.

The emulsion thus obtained was added with 900 parts of vinyl acetate which had been separately boiled and deaerated, and the mixture was controlled to a temperature of 40° C. The aqueous solution of potassium persulfate used above and the aqueous solution of Eleminol ES-70 having a concentration of 18% which had been separately deaerated were continuously and uniformly added at 5 parts/hour and 12 parts/hour, respectively, to initiate polymerization. After 3.0 hours, when the conversion to polymer reached 78.9% (the maximum rate of polymerization=29.3%/hr), the addition of the aqueous solution of potassium persulfate and the aqueous solution of Eleminol ES-70 was discontinued to terminate polymerization. The emulsion thus obtained had an average particle diameter of 0.246 μm and the number of polyvinyl acetate particles per unit volume of the emulsion of $7.7 \times 10^{13}$/ml. The amount of 48.5 parts of emulsion ($W_2$) are expressed by the following formula:

$$\text{Amount of emulsifier } (W_2) = \frac{M_w \times A_2}{A_m \times 100 \times 0.18} \times 167$$

where $M_w$, $A_2$ and $A_m$ have the same meanings as defined above.

The emulsion thus obtained was poured into a solution of 0.6 part of hydroquinone monomethyl ether in 15000 parts of dimethyl sulfoxide at room temperature to dissolve the emulsion with stirring. After dissolution, unreacted vinyl acetate was removed at 70° C. while adding dimethyl sulfoxide under reduced pressure to give a solution of polyvinyl acetate in dimethyl sulfoxide. A portion of the solution was taken out and poured into distilled water to separate polyvinyl acetate which was purified several times by reprecipitation in a mixed solvent of acetone and n-hexane, poured into distilled water and boiled. The purified polyvinyl acetate was thus obtained. The polyvinyl acetate was dissolved in methanol and hydrolyzed at a PVAc concentration of 10%, at a molar ratio of [NaOH]/[VAc]=0.10 at 40° C. to give a polyvinyl alcohol. The polyvinyl alcohol was reacetylated and purified under the same conditions as in Example 1 to give polyvinyl acetate. The polyvinyl acetate had a viscosity average degree of polymerization of 5,000.

Next, the dimethyl sulfoxide solution of polyvinyl acetate was hydrolyzed at a PVAc concentration of 10% at a molar ratio of [NaOH]/[VAc]=0.15 at 40° C. under nitrogen stream. After the removal of the liquid, the resulting polyvinyl alcohol was hydrolyzed again, neutralized, washed with water and then with methanol and dried in the same manner as in Example 1 to give a purified polyvinyl alcohol. The polyvinyl alcohol had a degree of hydrolysis of 99.8 mol %. The polyvinyl acetate which had been reacetylated and purified by reprecipitation in the same manner as mentioned above had a viscosity average degree of polymerization of 4,950.

In the aforementioned seed polymerization, the charge A (mol/l) of the water-soluble initiator (potassium persulfate) per unit volume (1 liter) of reactant liquid charge was $2.10 \times 10^{-6}$, and the charge B (mol/particle) of the water-soluble initiator (potassium persulfate) per particle of the vinyl ester polymer in a seed emulsion was $1.75 \times 10^{-23}$. The charge C (mol/l.sec) of the water-soluble initiator (potassium persulfate) per unit volume (1 liter) of reactant liquid charge per unit time (1 sec) was $1.94 \times 10^{-10}$. In addition, the Y value defined as above was $9.72 \times 10^{-4}$.

Comparative Example 2

In the same reactor as in Example 1 were fed 1000 parts of deionized water, 1000 parts of vinyl acetate, 50.0 parts of an 80% aqueous solution of sodium polyoxyethylene [POE (35)] nonylphenyl ether sulfate (Eleminol ES-70, a product of Sanyo Chemical Industries, Ltd.), 0.80 part of Rongalite and 0.06 part of FeSO$_4$.7 H$_2$O. After boiling the reactants for 30 minutes, they were cooled to 40° C. while introducing nitrogen. Then, a 0.025% aqueous solution of potassium persulfate which had been separately prepared by using deaerated deionized water was continuously and uniformly added to the reactants at a rate of 7 parts per hour to initiate polymerization. After 3.0 hours, when the conversion to polymer reached 77.8% (the maximum polymerization rate of 29.0%/hour), the addition of the aqueous solution of potassium persulfate was discontinued to terminate the polymerization.

The emulsion thus obtained had an average particle diameter of 0.302 μm and the number of particles of the polyvinyl acetate per unit volume of the emulsion of $4.4 \times 10^{13}$/ml. The amount of 12.5 parts of an emulsifier ($W_1$) is expressed by the following formula:

$$\text{Amount of emulsifier } (W_1) = \frac{M_w \times A_1}{A_m \times 100 \times 0.80} \times 522$$

where $M_w$, $A_1$ and $A_m$ have the same meanings as defined above.

A dimethyl sulfoxide solution of polyvinyl acetate was obtained by treating the emulsion thus obtained in the same manner as in Example 2. After taking out the purified polyvinyl acetate by treating a portion of the solution in the same manner as in Example 2, a methanol solution having a PVAc concentration of 10% was prepared. It was then hydrolyzed, purified, dried, reacetylated and purified in the same manner as in Example 1 to give a purified polyvinyl acetate. The polyvinyl acetate had a viscosity average degree of polymerization of 3,500 which was calculated from the intrinsic viscosity thereof in acetone at 30°.

Next, the dimethyl sulfoxide solution of polyvinyl acetate was hydrolyzed, rehydrolyzed, neutralized, washed and dried under the same conditions as in Example 2 to obtain a purified polyvinyl alcohol. The polyvinyl alcohol had a degree of hydrolysis of 99.8 mol %. The PVA was reacetylated under the same conditions as above, and the polyvinyl acetate reprecipitated and purified in the same manner as above had a viscosity average degree of polymerization of 3,500 which was calculated from the intrinsic viscosity thereof measured in acetone at 30° C.

Comparative Example 3

Polymerization, hydrolysis and purification were conducted in the same manner as in Comparative Example 1 except that the following polymerization conditions were employed, and the degree of hydrolysis and the viscosity average degree of polymerization of the polyvinyl acetate and polyvinyl alcohol thus obtained were measured. Only changed polymerization conditions are specified below. In the reactor were fed 40 parts of a 35% aqueous solution of sodium polyoxyethylene [POE (30)] lauryl ether sulfate (TRACKS K-300, a product of Nippon Oil & Fats Co., Ltd.), 1.40 parts of Rongalite, 0.15 part of $FeSO_4 \cdot 7 H_2O$ and 360 parts of methanol as well as deionized water and vinyl acetate in the same amounts as specified in Comparative Example 1. After the mixture was boiled and deaerated, it was cooled to $-20°$ C. A 0.020% aqueous hydrogen peroxide solution was uniformly and continuously added to the mixture at a rate of 10 parts/hour to initiate polymerization. After 6.0 hours, when the conversion to polymer reached 51.2% (the maximum polymerization rate=9.1%/hour), polymerization was stopped. The emulsion thus obtained had an average diameter of 0.317 μm and the number of polyvinyl acetate particles per unit volume of emulsion of $1.7 \times 10^{13}$/ml. The amount of 40 parts of an emulsifier is expressed by the following formula:

$$\text{Amount of emulsifier } (W_1) = \frac{M_w \times A_1}{A_m \times 100 \times 0.35} \times 276$$

where $M_w$, $A_1$ and $A_m$ have the same meanings as defined above.

The emulsion thus obtained was poured into a solution of 1 part of hydroquinone monomethyl ether in 70,000 parts of methanol at room temperature to dissolve the emulsion with stirring. The polyvinyl acetate had a viscosity average degree of polymerization of 24,000. The polyvinyl alcohol obtained by the hydrolysis of the polyvinyl acetate had a degree of hydrolysis of 99.8% and a viscosity average degree of polymerization of 24,000.

In comparison with the following Examples 3, 5 and 7 in which polymerization was conducted at the same temperature, Comparative Example 3 without the use of seed polymerization shows low degree of the polymerization of polyvinyl acetate and polyvinyl alcohol obtained.

Examples 3–10 and Comparative Examples 4–5

Polymerization, hydrolysis and purification were conducted in the same manner as in Example 1 except that the conditions were changed into the conditions for producing seed emulsions shown in Table 1 and the conditions for conducting seed polymerization shown in Table 2. The results of the production of seed emulsions are shown in Table 1, and the results of seed polymerization are shown in Table 2, respectively. In this connection, the coverage (Co) shown in Table 1 satisfies the following relation:

$$W_1 = \frac{M_w \times A_1}{A_m \times 100 \times A_n \times 0.01} \times Co$$

where
$W_1$: used amount of an emulsifier,
$M_w$: molecular weight of an emulsifier,
$A_1$: total surface area of particles in emulsion,
$A_m$: area occupied by emulsifier molecules,
$A_n$: concentration of emulsifier.

On the other hand, the coverage (Co) shown in Table 2 satisfies the following relation:

$$W_2 = \frac{M_w \times A_2}{A_m \times 100 \times A_n \times 0.01} \times Co$$

where
$W_2$: used amount of an emulsifier,
$M_w$: molecular weight of an emulsifier,
$A_2$: total surface area of particles in emulsion,
$A_m$: area occupied by emulsifier molecules,
$A_n$: concentration of emulsifier.

TABLE 1

Conditions for producing seed emulsions

| | Water (part) | Vinyl acetate (part) | Methanol (part) | Emulsifier (part) | Initiator (a) (%) (part/hr) | (b) (part) | (c) (part) | Temperature (°C.) |
|---|---|---|---|---|---|---|---|---|
| Example 3 | 1000 | 60 | 0 | Sodium polyoxyethylene [POE (30)] lauryl ether sulfate (35%) 20 | $H_2O_2$ (0.010) 5 | $FeSO_4 \cdot 7H_2O$ 0.03 | Rongalite 0.60 | 5 |
| Example 4 | 500 | 15 | 180 | Sodium polyoxyethylene [POE (30)] lauryl ether sulfate (35%) 23 | $H_2O_2$ (0.020) 20 | $FeSO_4 \cdot 7H_2O$ 0.03 | Rongalite 0.40 | −20 |
| Example 5 | 500 | 15 | 0 | Sodium polyoxyethylene [POE (20)] lauryl ether sulfate (30%) 6 | $H_2O_2$ (0.010) 5 | $FeSO_4 \cdot 7H_2O$ 0.03 | Rongalite 0.60 | 5 |
| Example 6 | 1000 | 150 | 0 | Ammonium polyoxyethylene [POE (21.5)] nonylphenyl ether sulfate (92%) 2 | $K_2S_2O_8$ (0.020) 4 | $FeSO_4 \cdot 7H_2O$ 0.03 | Rongalite 0.60 | 15 |
| Example 7 | 1200 | 24 | 0 | Sodium polyoxyethylene [POE (10)] nonylphenyl ether sulfate (30%) 12 | $H_2O_2$ (0.020) 5 | $FeSO_4 \cdot 7H_2O$ 0.03 | Rongalite 0.60 | 5 |
| Example 8 | 1000 | 20 | 0 | Sodium polyoxyethylene [POE (30)] lauryl ether sulfate (35%) 0.5 | $H_2O_2$ (0.010) 5 | $FeSO_4 \cdot 7H_2O$ 0.03 | Rongalite 0.60 | 5 |
| Example 9 | 1000 | 30 | 0 | Sodium polyoxyethylene | $H_2O_2$ | $FeSO_4 \cdot 7H_2O$ | Rongalite | 5 |

TABLE 1-continued

| | | | | | | | | | |
|---|---|---|---|---|---|---|---|---|---|
| Example 10 | 1000 | 150 | 0 | [POE (35)] nonylphenyl ether sulfate (30%) 50 Ammonium polyoxyethylene [POE (21.5)] nonylphenyl ether sulfate (92%) 2 | (0.010) 5 $K_2S_2O_8$ (0.020) 4 | 0.03 $FeSO_4.7H_2O$ 0.03 | 0.60 Rongalite 0.60 | 15 |
| Comparative Example 4 | 1000 | 250 | 0 | Sodium polyoxyethylene [POE (30)] lauryl ether sulfate (35%) 6 | $H_2O_2$ (0.008) 5 | 0.03 $FeSO_4.7H_2O$ 0.03 | 0.60 Rongalite 0.60 | 5 |
| Comparative Example 5 | 1000 | 30 | 0 | Sodium lauryl sulfate (100%) 20 | $H_2O_2$ (0.100) 20 | 0.03 $FeSO_4.7H_2O$ 0.03 | 0.60 Rongalite 0.60 | 60 |

| | Results of production of seed emulsions | | | | |
|---|---|---|---|---|---|
| | Polymerization time (hour) | Conversion (%) | Particle diameter ($\mu m$) | Number of particles ($ml^{-1}$) | Coverage (%) |
| Example 3 | 1.0 | 26.7 | 0.064 | $9.8 \times 10^{13}$ | 349 |
| Example 4 | 1.0 | 42.3 | 0.086 | $2.2 \times 10^{13}$ | 473 |
| Example 5 | 1.0 | 18.1 | 0.022 | $8.2 \times 10^{14}$ | 256 |
| Example 6 | 1.0 | 70.2 | 0.229 | $1.4 \times 10^{13}$ | 65 |
| Example 7 | 1.5 | 52.9 | 0.016 | $4.1 \times 10^{15}$ | 122 |
| Example 8 | 1.0 | 25.6 | 0.020 | $1.0 \times 10^{15}$ | 8.7 |
| Example 9 | 1.0 | 18.9 | 0.019 | $1.3 \times 10^{15}$ | 553 |
| Example 10 | 1.0 | 70.2 | 0.229 | $1.4 \times 10^{13}$ | 65 |
| Comparative Example 4 | 1.0 | 71.8 | 0.310 | $9.7 \times 10^{12}$ | 46 |
| Comparative Example 5 | 1.0 | 29.4 | 0.012 | $8.0 \times 10^{15}$ | 1235 |

TABLE 2

Conditions of seed polymerization

| | Additives on seed polymerization | | | | | | | | | |
|---|---|---|---|---|---|---|---|---|---|---|
| | $H_2O$ (part) | VAc (part) | MeOH (part) | Emulsifier (part/hr) | Initiator (a) (part/hr) | Temperature (°C.) | Charge A (mol/l) | Charge B (ml/particle) | Charge C (mol/l·sec) | Y value |
| Example 3 | 0 | 940 | 360 | Sodium polyoxyethylene [POE(30)] lauryl ether sulfate (35%) 10 | $H_2O_2$ (0.010%) 5 | −20 | $3.51 \times 10^{-5}$ | $3.58 \times 10^{-22}$ | $1.62 \times 10^{-9}$ | $9.90 \times 10^{-3}$ |
| Example 4 | 500 | 985 | 360 | Sodium polyoxyethylene [POE(30)] lauryl ether sulfate (35%) 5 | $H_2O_2$ (0.020%) 5 | −30 | $1.18 \times 10^{-4}$ | $5.37 \times 10^{-21}$ | $5.97 \times 10^{-9}$ | $1.63 \times 10^{-3}$ |
| Example 5 | 500 | 985 | 360 | Sodium polyoxyethylene [POE(20)] lauryl ether sulfate (30%) 4 | $H_2O_2$ (0.010%) 5 | −20 | $3.51 \times 10^{-5}$ | $4.28 \times 10^{-23}$ | $1.62 \times 10^{-9}$ | $1.19 \times 10^{-4}$ |
| Example 6 | 0 | 850 | 0 | Ammonium polyoxyethylene [POE(21.5)] nonylphenyl ether sulfate (30%) 3 | $K_2S_2O_8$ (0.020%) 4 | 15 | $5.02 \times 10^{-6}$ | $3.59 \times 10^{-22}$ | $3.98 \times 10^{-10}$ | $1.70 \times 10^{-2}$ |
| Example 7 | 0 | 776 | 360 | Polyoxyethylene [POE(40)] nonylphenyl ether (30%) 6 | $H_2O_2$ (0.010%) 5 | −20 | $2.94 \times 10^{-5}$ | $7.17 \times 10^{-24}$ | $1.63 \times 10^{-9}$ | $2.39 \times 10^{-4}$ |
| Example 8 | 0 | 980 | 0 | Sodium polyoxyethylene [POE(35) nonylphenyl ether sulfate (30%) 5 | $H_2O_2$ (0.015%) 5 | 5 | $1.21 \times 10^{-4}$ | $1.21 \times 10^{-22}$ | $2.81 \times 10^{-9}$ | $1.69 \times 10^{-3}$ |
| Example 9 | 0 | 770 | 0 | Sodium polyoxyethylene [POE(35) nonylphenyl ether sulfate (30%) 15 | $H_2O_2$ (0.015%) 5 | 5 | $1.08 \times 10^{-4}$ | $8.27 \times 10^{-23}$ | $2.99 \times 10^{-9}$ | $1.38 \times 10^{-3}$ |
| Example 10 | 0 | 300 | 0 | Ammonium polyoxyethylene [POE (21.5)] nonylphenyl ether sulfate (30%) 3 | $K_2S_2O_8$ (0.010%) 4 | 15 | $2.47 \times 10^{-6}$ | $1.76 \times 10^{-23}$ | $2.74 \times 10^{-10}$ | $1.18 \times 10^{-2}$ |
| Comparative Example 4 | 0 | 750 | 360 | Sodium polyoxyethylene [POE(30)] lauryl ether sulfate (35%) 5 | $H_2O_2$ (0.015%) 5 | −20 | $2.53 \times 10^{-4}$ | $2.61 \times 10^{-20}$ | $7.03 \times 10^{-9}$ | $4.35 \times 10^{-1}$ |
| Comparative Example 5 | 0 | 850 | 0 | Sodium lauryl sulfate (20%) 6 | $H_2O_2$ (0.10%) 3 | 60 | $2.70 \times 10^{-4}$ | $3.37 \times 10^{-23}$ | $1.25 \times 10^{-8}$ | $9.36 \times 10^{-4}$ |

Results of seed polymerization

TABLE 2-continued

|  | Polymerization time (hr) | Conversion (%) | Maximum Polymerization rate (%/hr) | Particle diameter (μm) | Number of particles (ml$^{-1}$) | Coverage (%) | Average degree of polymerization of vinyl ester polymer | Vinyl alcohol polymer | |
|---|---|---|---|---|---|---|---|---|---|
|  |  |  |  |  |  |  |  | Average degree of polymerization | Degree of hydrolysis |
| Example 3 | 6.0 | 50.9 | 9.0 | 0.210 | 5.7×10$^{13}$ | 129 | 32,000 | 32,000 | 99.9 |
| Example 4 | 5.5 | 49.3 | 10.2 | 0.370 | 8.6×10$^{12}$ | 140 | 34,000 | 34,000 | 99.8 |
| Example 5 | 6.0 | 57.9 | 11.0 | 0.128 | 3.0×10$^{14}$ | 31 | 33,800 | 33,700 | 99.8 |
| Example 6 | 3.5 | 71.6 | 20.8 | 0.439 | 1.3×10$^{13}$ | 44 | 11,700 | 11,700 | 99.9 |
| Example 7 | 5.0 | 63.6 | 13.9 | 0.087 | 7.3×10$^{14}$ | 13 | 30,200 | 30,200 | 99.9 |
| Example 8 | 12.0 | 32.6 | 3.5 | 0.962 | 4.9×10$^{11}$ | 529 | 6,600 | 6,600 | 99.8 |
| Example 9 | 10.0 | 54.7 | 5.9 | 0.136 | 2.3×10$^{14}$ | 205 | 10,500 | 10,500 | 99.7 |
| Example 10 | 2.5 | 72.6 | 24.3 | 0.421 | 6.9×10$^{12}$ | 85 | 4,700 | 4,700 | 99.9 |
| Comparative Example 4 | 10.0 | 35.9 | 3.8 | 0.429 | 4.7×10$^{12}$ | 267 | 14,000 | 14,000 | 99.8 |
| Comparative Example 5 | 6.0 | 60.7 | 21.6 | 0.047 | 7.5×10$^{15}$ | 109 | 3,600 | 3,600 | 99.8 |

EXAMPLE 11

In the same manner as in Example 1, emulsion polymerization was carried out at 5° C. to obtain an emulsion, which was used as the seed emulsion to effect seed polymerization at 5° C. 1.5 hours later when the conversion to polymer reached 25.2% (the maximum rate of polymerization=17%/hour), continuous addition of the seed emulsion which had been separately prepared in the same manner as in Example 1, vinyl acetate, 20% aqueous solution of Nonipol 400 and 0.010% hydrogen peroxide was initiated at a rate of 610, 590, 10 and 10 parts per hour, respectively, and at the same time, reaction liquid mixture was continuously removed from the reactor (No. 1 reactor) at a rate of 1220 parts per hour, and introduced into No. 2 reactor equipped with the same devices as those of No. 1 reactor. In No. 2 reactor were uniformly and continuously fed 20% aqueous solution of Nonipol 400 and 0.010% hydrogen peroxide at a rate of 10 parts per hour each. When the conversion to polymer reached 50% (polymerization time: 1.5 hours), the reaction mixture was continuously removed at rate of 1240 parts hour, and introduced into No. 3 reactor equipped with the same devices. In No. 3 reactor were uniformly and continuously charged 20% aqueous solution of Nonipol 400 and 0.010% hydrogen peroxide at a rate of 10 parts per hour each. When the conversion to polymer reached 75% (copolymerization time: 1.5 hours), the reaction mixture was continuously removed at a rate of 1260 parts per hour. The average particle diameter of the emulsion thus obtained was measured as 0.285 μm. The number of particles of the polyvinyl acetate per unit volume (1 ml) of the emulsion was 5.1×10$^{13}$. The charge A (mol/l) of the water-soluble initiator (hydrogen peroxide) per unit volume (1 liter) of reactant liquid charge was 6.2×10$^{-5}$, the charge B (mol/particle) of the water-soluble initiator (hydrogen peroxide) per one particle of vinyl ester polymer in seed emulsion was 2.4×10$^{31\ 22}$ mol per particle.

The emulsion thus obtained was subjected to hydrolysis and purification in the same manner as in Example 1 to obtain polyvinyl acetate having a viscosity average degree of polymerization of 22,000. In addition, the polyvinyl alcohol which was obtained by hydrolyzing the above polyvinyl acetate had a degree of hydrolysis of 99.8 mol % and a viscosity average degree of polymerization of 22,000.

EXAMPLE 12

In the same manner as in Example 1, a seed emulsion was obtained. Thereafter, the procedure of Example 1 was repeated except that a dry-ice cooling pipe was further attached to the cooling pipe which had been fitted to the reactor, and the reaction conditions were changed to a polymerization temperature of 25° C. and degree of vacuum of 125 Torr to carry out seed polymerization, wherein 20% aqueous solution of Nonipol 400 and 0.01% hydrogen peroxide were uniformly and continuously added at a rate of 10 parts per hour each and vinyl acetate monomer was constantly refluxed. When the polymerization time reached 5.3 hours, the addition of hydrogen peroxide, water and aqueous solution of Nonipol 400 was discontinued to arrest further polymerization. The conversion to polymer was 78.0% (the maximum rate of polymerization=20.6%/hr). The average particle diameter of the emulsion thus obtained was measured to indicate 0.201 μm. The number of particles of the polyvinyl acetate per unit volume of the emulsion was 1.1×10$^{14}$ per ml.

In the present Example in which the emulsion polymerization was carried out under reduced pressure, scale adhesion to the wall of the reactor and to the stirrer was markedly lessened and the control for reactor temperature was facilitated as compared with the result of Example 1. The emulsion thus obtained was subjected to hydrolysis and purification in the same manner as in Example 1 to obtain polyvinyl acetate having a viscosity average degree of polymerization of 12,000. In addition, PVA which was obtained by hydrolyzing the above-mentioned polyvinyl acetate had a degree of hydrolysis of 99.8 mol % and a viscosity average degree of polymerization of 12,000.

EXAMPLE 13

In a reactor equipped with a stirrer, a thermometer, a nitrogen inlet and a cooling pipe were fed 1000 parts of deionized water, 30 parts of vinyl acetate, 20 parts of a polyvinyl alcohol (degree of polymerization, 500; degree of hydrolysis, 88 mol %; PVA-205, a product of Kuraray Co., Ltd.), 0.90 part of Rongalite and 0.05 part of FESO$_4$.7 H$_2$O. The reactants were boiled for 30 minutes and then cooled to 5° C. while introducing nitrogen. Then, a 0.050% aqueous solution of potassium persulfate which had been separately prepared by using deaerated deionized water was continuously and uniformly added to the reactants at a rate of 5 parts per hour to initiate polymerization. During polymerization, the system was sealed with nitrogen gas to prevent the invasion of oxygen. After 0.1 hour, the polymerization solution turned into blue, and after 0.5 hour, when the conversion to polymer reached 50.1%, the addition of the aqueous solution of potassium persulfate was discontinued to arrest further polymerization, and the stirring was further conducted for 0.5 hour to give a conversion to polymer of 52.1%. The emulsion thus obtained had an average particle diameter of 0.070 μm and the number of particles of the polyvinyl acetate per unit volume of the emulsion of $7.3 \times 10^{13}$/ml.

The emulsion thus obtained was added with 970 parts of vinyl acetate which had been separately boiled for 30 minutes, and the mixture was cooled to 5° C. while introducing nitrogen. A 0.050% aqueous solution of potassium persulfate prepared with separately deaerated deionized water and a 20% aqueous solution of polyvinyl alcohol (degree of polymerization, 500; degree of hydrolysis, 88 mol %, PVA-205, a product of Kuraray Co., Ltd.) prepared with separately deaerated deionized water were continuously and uniformly added at 10 parts/hour and 15 parts/hour, respectively, to initiate polymerization. During polymerization, the system was sealed with nitrogen gas to prevent the invasion of oxygen. After 5.0 hours, when the conversion to polymer reached 75.6% (the maximum rate of polymerization = 16%/hr), the addition of the aqueous solution of potassium persulfate and the aqueous solution of polyvinyl alcohol was discontinued to terminate polymerization. The emulsion thus obtained had an average particle diameter of 0.53 μm and the number of polyvinyl acetate particles per unit volume of $7.4 \times 10^{12}$/ml.

The emulsion thus obtained was poured into a solution of 1 part of hydroquinone monomethyl ether in 70000 parts of methanol at room temperature to dissolve the emulsion with stirring. After dissolution, unreacted vinyl acetate was removed while adding methanol under reduced pressure to give a solution of polyvinyl acetate in methanol. A portion of the solution was taken out and hydrolyzed at a PVAc concentration of 6%, at a molar ratio of [NaOH]/[VAc]=0.1 at 40° C. to give a polyvinyl alcohol. A 0.1 part portion of the polyvinyl alcohol was reacetylated in a mixed solution of 8 parts of acetic anhydride and 2 parts of pyridine at 105° C. for 20 hours with occasional stirring. Polyvinyl acetate purified by the repeated reprecipitations with a mixed solvent of acetone and ether and with a mixed solvent of acetone and water, had a viscosity average degree of polymerization calculated from the intrinsic viscosity in acetone at 30° C. of 22,800.

Next, the methanol solution of polyvinyl acetate was hydrolyzed at a PVAc concentration of 6% at a molar ratio of [NaOH]/[VAc]=0.15 at 40° C. After the removal of the liquid, the resulting polyvinyl alcohol was hydrolyzed again at 40° C. for 24 hours by adding NaOH in the same amount as in the previous hydrolysis and dipping the mixture into methanol. The mixture was then washed with methanol and dried at 40° C. after the removal of liquid to give polyvinyl alcohol. The polyvinyl alcohol had a degree of hydrolysis of 99.8 mol %. The polyvinyl acetate which had been prepared by the reacetylation of the polyvinyl alcohol in the same manner as described above and purified by reprecipitation in the same manner as mentioned above had a viscosity average degree of polymerization of 22,800 calculated from the intrinsic viscosity thereof in acetone at 30° C.

In the aforementioned seed polymerization, the charge A (mol/l) of the water-soluble initiator (potassium persulfate) per unit volume (1 liter) of reactant liquid charge was $3.02 \times 10^{-5}$, and the charge B (mol/particle) of the water-soluble initiator (potassium persulfate) per one particle of the vinyl ester polymer in the seed emulsion was $4.13 \times 10^{-22}$. The charge C (mol/l.-sec) of the water-soluble initiator (potassium persulfate) per unit volume (1 liter) of reactant liquid charge per unit time (1 sec) was $1.68 \times 10^{-9}$. In addition, the Y value defined as above was $1.38 \times 10^{-2}$.

Comparative Example 6

In the same reactor as in Example 13 were fed 1000 parts of deionized water, 1000 parts of vinyl acetate, 40 parts of a polyoxyethylene [POE (40)] nonylphenyl ether (Nonipol 400, a product of Sanyo Chemical Industries, Ltd.), 1,25 parts of Rongalite and 0.12 part of $FeSO_4.7\ H_2O$. After boiling the reactants for 30 minutes, they were cooled to 5° C. while introducing nitrogen. Then, a 0,075% aqueous solution of hydrogen peroxide which had been separately prepared by using deaerated deionized water was continuously and uniformly added to the reactants at a rate of 10 parts per hour to initiate polymerization. During the polymerization, the system was sealed with nitrogen gas to prevent the invasion of oxygen in the same manner as in Example 13. After 3.5 hours, when the conversion to polymer reached 60.2% (the maximum polymerization rate of 17,2%/hour), the addition of the aqueous solution of hydrogen peroxide was discontinued to terminate the polymerization. The emulsion thus obtained had an average particle diameter of 0.28 μm and the number of particles of the polyvinyl acetate per unit volume of the emulsion of $4.2 \times 10^{13}$/ml.

The emulsion thus obtained was poured into a solution of 1 part of hydroquinone monomethyl ether in 25000 parts of methanol at room temperature and dissolved with stirring. After dissolution, unreacted vinyl acetate was removed in the same manner as in Example 13 to give a solution of polyvinyl acetate in methanol. A portion of this solution was taken out and subjected to hydrolysis and reacetylation under the same condition as in Example 13 to give a purified polyvinyl acetate. The polyvinyl acetate had a viscosity average degree of polymerization of 14,000 which was calculated from the intrinsic viscosity thereof in acetone at 30° C.

Next, the methanol solution of polyvinyl acetate was hydrolyzed, rehydrolyzed, washed and dried under the same conditions as in Example 13 to obtain polyvinyl alcohol. The polyvinyl alcohol had a degree of hydrolysis of 99.8 mol %. The PVA was reacetylated under the same conditions as above, and the polyvinyl acetate reprecipitated and purified in the same manner as above had a viscosity average degree of polymerization of 14,000 which was calculated from the intrinsic viscosity thereof measured in acetone at 30° C.

It can be understood from the above results that seed polymerization at 5° C. according to the present invention as shown in Example 13 resulted in a product having a viscosity average degree of polymerization of 22,800 in contrast to 14,000 in emulsion polymerization at 5° C. as shown in Comparative Example 6 which was conducted under almost the same polymerization condition as in Example 13. In addition, it is believed that while emulsion polymerization at 5° C. as shown in Comparative Example 6 in which an emulsifier is used as a dispersant presumably produces a polyvinyl alcohol containing an emulsifier, seed polymerization at 5° C. according to the present invention as described in Example 13 in which polyvinyl alcohol is used as a dispersant results in a pure polyvinyl alcohol free from an emulsifier.

EXAMPLE 14

In the same reactor as used in Example 13 were fed 1000 parts of deionized water, 100 parts of vinyl acetate, 12.5 parts of an 80% aqueous solution of sodium polyoxyethylene [POE (35)] nonylphenyl ether sulfate (Eleminol ES-70, a product of Sanyo Chemical Industries, Ltd.), 0.40 part of Rongalite and 0.03 part of FESO$_4$.7 H$_2$O. The reactants were boiled and then cooled to 40° C. Then, a 0.032% aqueous solution of potassium persulfate which had been separately prepared by using deaerated deionized water was continuously and uniformly added to the reactants at a rate of 8 parts per hour to initiate polymerization. After 0.2 hour, when the conversion to polymer reached 42.8%, the addition of the aqueous solution of potassium persulfate was discontinued, and the stirring was further conducted for 0.8 hour at 40° C. to give a conversion to polymer of 58.2%. The emulsion thus obtained had an average particle diameter of 0.097 μm and the number of particles of the polyvinyl acetate per unit volume of the emulsion of $1.2 \times 10^{14}$/ml.

The emulsion thus obtained was added with 900 parts of vinyl acetate which had been separately boiled for 30 minutes and cooled to 40° C. while introducing nitrogen, and the mixture was adjusted to 40° C. The 0.032% potassium persulfate solution which had been prepared with separately deaerated deionized water and the aqueous solution of polyvinyl alcohol (degree of polymerization, 2000; degree of hydrolysis, 80 mol %, PVA-420, a product of Kuraray Co., Ltd.) having a concentration of 10% which had been prepared with separately deaerated deionized water were continuously and uniformly added at 8 parts/hour and 50 parts/hour, respectively, to initiate polymerization. During the polymerization, the system was sealed with nitrogen gas to prevent the invasion of oxygen. After 3.5 hours, when the conversion to polymer reached 79.3% (the maximum rate of polymerization=28%/hr), the addition of the aqueous solution of potassium persulfate and the aqueous solution of vinyl alcohol was discontinued to terminate polymerization. The emulsion thus obtained had an average particle diameter of 0.89 μm and the number of polyvinyl acetate particles per unit volume of $1.4 \times 10^{12}$/ml.

The emulsion thus obtained was poured into a solution of 0.6 part of hydroquinone monomethyl ether in 15000 parts of dimethyl sulfoxide at room temperature to dissolve the emulsion with stirring. After. dissolution, unreacted vinyl acetate was removed at 70° C. while adding dimethyl sulfoxide under reduced pressure to give a solution of polyvinyl acetate in dimethyl sulfoxide. A portion of the solution was taken out and poured into distilled water to separate polyvinyl acetate which was purified several times by reprecipitation in a mixed solvent of acetone and n-hexane, poured into distilled water again and boiled to give a purified polyvinyl acetate. The polyvinyl acetate was dissolved in methanol and hydrolyzed at a PVAc concentration of 10%, at a molar ratio of [NaOH]/[VAc]=0.10 at 40° C. to give a polyvinyl alcohol. The polyvinyl alcohol was reacetylated and purified under the same conditions as in Example 13 to give polyvinyl acetate. The polyvinyl acetate had a viscosity average degree of polymerization 5,200.

Next, the solution of polyvinyl acetate in dimethyl sulfoxide was hydrolyzed at a PVAc concentration of 10% at a molar ratio of [NaOH]/[VAc]=0.15 at 40° C. under nitrogen stream. After the removal of the liquid, the resulting polyvinyl alcohol was hydrolyzed again, neutralized, washed with water and then with methanol and dried in the same manner as in Example 13 to give a purified polyvinyl alcohol. The polyvinyl alcohol had a degree of hydrolysis of 99.8 mol %. The polyvinyl acetate which had been reacetylated and purified by reprecipitation in the same manner as mentioned above had a viscosity average degree of polymerization of 5,200.

In the aforementioned seed polymerization, the charge A (mol/l) of the water-soluble initiator (potassium persulfate) per unit volume (1 liter) of reactant liquid charge was $1.46 \times 10^{-6}$, and the charge B (mol/particle number) of the water-soluble initiator (potassium persulfate) per particle of the vinyl ester polymer in a seed emulsion was $1.22 \times 10^{-23}$. The charge C (mol/l.sec) of the water-soluble initiator (potassium persulfate) per unit volume (1 liter) of reactant liquid charge per unit time (1 sec) was $1.16 \times 10^{-10}$. In addition, the Y value defined as above was $5.80 \times 10^{-4}$.

Comparative Example 7

In the same reactor as in Example 13 were fed 1000 parts of deionized water, 1000 parts of vinyl acetate, 50 parts of an 80% aqueous solution of polyoxyethylene [POE (35)] nonylphenyl ether (Eleminol ES-70, a product of Sanyo Chemical Industries, Ltd.), 0.80 part of Rongalite and 0.06 part of FeSO$_4$.7 H$_2$O. After boiling the reactants for 30 minutes, they were cooled to 40° C. while introducing nitrogen. Then, a 0.025% aqueous solution of potassium persulfate which had been separately prepared by using deaerated deionized water was continuously and uniformly added to the reactants at a rate of 7 parts per hour to initiate polymerization. After 3.0 hours, when the conversion to polymer reached 77.8% (the maximum polymerization rate of 29%/hour), the addition of the aqueous solution of potassium persulfate was discontinued to terminate the polymerization.

The emulsion thus obtained had an average particle diameter of 0.30 μm and the number of particles of the polyvinyl acetate per unit volume of the emulsion of $4.4 \times 10^{14}$/ml.

The emulsion thus obtained was treated in the same manner as in Example 14 to give a solution of polyvinyl acetate in dimethyl sulfoxide. A portion of this solution was further treated in the same manner as in Example 14 to take out a purified polyvinyl acetate, from which a 10% solution in methanol was prepared. It was then subjected to hydrolysis, purification, drying, reacetylation and drying in the same manner as in Example 13 to give a purified polyvinyl acetate. The polyvinyl acetate had a viscosity average degree of polymerization of 3,500 which was calculated from the intrinsic viscosity thereof in acetone at 30° C.

Next, a solution of polyvinyl acetate in dimethyl sulfoxide was hydrolyzed, rehydrolyzed, washed with methanol and dried under the same conditions as in Example 14 to obtain polyvinyl alcohol. The polyvinyl alcohol had a degree of hydrolysis of 99.8 mol %. The PVA was reacetylated under the same condition as above, and the polyvinyl acetate reprecipitated and purified in the same manner as above had a viscosity average degree of polymerization of 3,500 which was calculated from the intrinsic viscosity thereof measured in acetone at 30° C.

Comparative Example 8

Polymerization, hydrolysis and purification were conducted in the same manner as in Example 13 except that the following polymerization conditions were employed, and the degree of hydrolysis and the viscosity average degree of polymerization of the polyvinyl acetate and polyvinyl alcohol thus obtained were measured. Only changed polymerization conditions are specified below. In the reactor were fed 40 parts of a 35% aqueous solution of sodium polyoxyethylene [POE (30)] lauryl ether sulfate (TRACKS K-300, a product of Nippon Oil & Fats Co., Ltd.), 1.40 parts of Rongalite, 0.15 part of $FeSO_4.7 H_2O$ and 360 parts of methanol as well as deionized water and vinyl acetate in the same amounts as specified in Example 13. After the mixture was boiled and deaerated, it was cooled to $-20°$ C. A 0.020% aqueous hydrogen peroxide solution was uniformly and continuously added to the mixture at a rate of 10 parts/hour to initiate polymerization. After 6.0 hours, when the conversion to polymer reached 51.2% (the maximum polymerization rate=9.1%/hour), polymerization was stopped. The emulsion thus obtained had an average diameter of 0.317 μm and the number of particles of polyvinyl acetate per unit volume of the emulsion of $1.7\times10^{13}$/ml.

The emulsion thus obtained was poured into a solution of 1 part of hydroquinone monomethyl ether in 70,000 parts of methanol at room temperature to dissolve the emulsion with stirring. The polyvinyl acetate had a viscosity average degree of polymerization of 24,000. The polyvinyl alcohol obtained by the hydrolysis of the polyvinyl acetate had a degree of hydrolysis of 99.8% and a viscosity average degree of polymerization of 24,000.

In comparison with Example 16 in which polymerization is conducted at the same temperature, the polyvinyl acetate and polyvinyl alcohol obtained have low degrees of polymerization in Comparative Example 8 in which polymerization other than seed polymerization was conducted.

Examples 15-17 and Comparative Examples 9 and 10

Treatments such as polymerization, hydrolysis and purification were conducted in the same manner as in Example 13 except that the conditions were changed into the conditions for producing seed emulsions shown in Table 3 and the conditions for conducting seed polymerization shown in Table 4.

The results of the production of seed emulsions are shown in Table 3, and the results of seed polymerization are shown in Table 4, respectively.

TABLE 3

| | Conditions for producing seed emulsions | | | | | | |
|---|---|---|---|---|---|---|---|
| | | | | Initiator | | | |
| | Water (part) | Vinyl acetate (part) | Emulsifier (part) | (a) (%) (part/hr) | (b) (part) | (c) (part) | Temperature (°C.) |
| Example 15 | 1000 | 60 | PVA (degree of polymerization, 1700; degree of hydrolysis, 98.5 mol %) 4 | $H_2O_2$ (0.020) 3 | $FeSO_4.7H_2O$ 0.03 | Rongalite 0.40 | 25 |
| Example 16 | 1000 | 30 | PVA*[1] (degree of polymerization, 300; degree of hydrolysis, 60 mol %) 8 | $K_2S_2O_8$ (0.050) 3 | $FeSO_4.7H_2O$ 0.08 | Rongalite 1.20 | 5 |
| Example 17 | 500 | 50 | PVA (degree of polymerization, 1700; degree of hydrolysis, 88 mol %) 20 | $K_2S_2O_8$ (0.040) 3 | $FeSO_4.7H_2O$ 0.03 | Rongalite 0.40 | 15 |
| Comparative Example 9 | 1000 | 250 | PVA (degree of polymerization, 500; degree of hydrolysis, 88 mol %) 6 | $H_2O_2$ (0.008) 5 | $FeSO_4.7H_2O$ 0.03 | Rongalite 0.60 | 5 |
| Comparative Example 10 | 1000 | 30 | PVA (degree of polymerization, 300; degree of hydrolysis, 80 mol %) 20 | $H_2O_2$ (0.100) 10 | $FeSO_4.7H_2O$ 0.03 | Rongalite 0.60 | 60 |

| | Results of producing seed emulsions | | | |
|---|---|---|---|---|
| | Polymerization time (hour) | Conversion (%) | Particle diameter (μm) | Number of particle (ml$^{-1}$) |
| Example 15 | 0.5 | 31.6 | 0.12 | $1.8\times10^{13}$ |
| Example 16 | 0.5 | 50.6 | 0.041 | $3.5\times10^{14}$ |
| Example 17 | 1.0 | 56.0 | 0.13 | $4.0\times10^{13}$ |
| Comparative Example 9 | 1.0 | 76.1 | 0.460 | $3.1\times10^{12}$ |
| Comparative Example 10 | 1.0 | 27.9 | 0.065 | $4.9\times10^{13}$ |

*[1]Copolymer of 3 mol % of sodium allylsulfonate

TABLE 4

| | Conditions of seed polymerization | | | | | | | | | |
|---|---|---|---|---|---|---|---|---|---|---|
| | Additives on seed polymerization | | | Vinyl alcohol polymer (part/hr) | Initiator (a) (part/hr) | Temperature (°C.) | Charge A (mol/l) | Charge B (ml/particle) | Charge C (mol/l · sec) | Y value |
| | $H_2O$ (part) | VAc (part) | MeOH (part) | | | | | | | |
| Example 15 | 0 | 1140 | 0 | PVA (degree of polymerization, | $H_2O_2$ (0.010%) | 25 | $6.14\times10^{-5}$ | $3.41\times10^{-21}$ | $2.62\times10^{-9}$ | $8.76\times10^{-2}$ |

TABLE 4-continued

| | | | | | | | | | | |
|---|---|---|---|---|---|---|---|---|---|---|
| Example 16 | 0 | 770 | 333 | 500; degree of hydrolysis, 80 mol %)(20%) 25 PVA*1 (degree of polymerization, 300; degree of hydrolysis, 60 mol %)(20%) 15 | $K_2S_2O_8$ (0.050%) 15 | 8 −20 | $8.20 \times 10^{-5}$ | $2.34 \times 10^{-22}$ | $3.79 \times 10^{-9}$ | $2.77 \times 10^{-4}$ |
| Example 17 | 500 | 950 | 0 | PVA (degree of polymerization, 200; degree of hydrolysis, 88 mol %)(30%) 30 | $K_2S_2O_8$ (0.040%) 12 | 15 | $3.55 \times 10^{-5}$ | $8.87 \times 10^{-22}$ | $2.19 \times 10^{-9}$ | $3.29 \times 10^{-2}$ |
| Comparative Example 9 | 0 | 750 | 360 | PVA (degree of polymerization, 8000; degree of hydrolysis, 88 mol %)(3%) 30 PVA*1 (degree of polymerization, 300; degree of hydrolysis, 60 mol %)(20%) 6 | $H_2O_2$ (0.015%) 5 | −20 | $6.78 \times 10^{-5}$ | $2.19 \times 10^{-20}$ | $2.36 \times 10^{-9}$ | $4.57 \times 10^{-1}$ |
| Comparative Example 10 | 0 | 850 | 0 | PVA (degree of polymerization, 300; degree of hydrolysis, 80 mol %)(20%) 10 | $H_2O_2$ (0.10%) 3 | 60 | $2.63 \times 10^{-4}$ | $5.36 \times 10^{-21}$ | $1.22 \times 10^{-8}$ | $1.49 \times 10^{-1}$ |

| | Results of seed polymerization | | | | | | |
|---|---|---|---|---|---|---|---|
| | Polymer-ization time (hr) | Conversion (%) | Maximum Polymer-ization rate (%/hr) | Par-ticle diam-eter (μm) | Number of particles (ml$^{-1}$) | Average degree of polymerization of vinyl ester polymer | Vinyl alcohol polymer | |
| | | | | | | | Average degree of polymerization | Degree of hydrolysis (mol %) |
| Example 15 | 6.5 | 75.5 | 12 | 1.26 | $6.6 \times 10^{11}$ | 11,600 | 11,600 | 99.8 |
| Example 16 | 6.0 | 59.6 | 12 | 1.69 | $1.0 \times 10^{11}$ | 32,400 | 32,400 | 99.8 |
| Example 17 | 4.5 | 64.9 | 14 | 0.81 | $1.8 \times 10^{12}$ | 14,700 | 14,700 | 99.8 |
| Comparative Example 9 | 8.0 | 37.4 | 5.1 | 2.79 | $1.8 \times 10^{10}$ | 11,600 | 11,600 | 99.8 |
| Comparative Example 10 | 6.0 | 66.7 | 21 | 0.92 | $1.1 \times 10^{12}$ | 3,300 | 3,300 | 99.8 |

*1Copolymer of 3 mol % of sodium allylsulfonate

EXAMPLE 18

In a reactor equipped with a stirrer, a thermometer, a nitrogen inlet and a cooling pipe were fed 1000 parts of deionized water, 1000 parts of vinyl acetate, 100 parts of a polyvinyl alcohol (degree of polymerization, 500; degree of hydrolysis, 80 mol %; PVA-405, a product of Kuraray Co., Ltd.), 1.05 parts of Rongalite and 0.05 part of $FESO_4.7 H_2O$. The reactants were boiled for 30 minutes and then cooled to 5° C. while introducing nitrogen. Then, a 0.022% aqueous solution of hydrogen peroxide which had been separately prepared by using deaerated deionized water was continuously and uniformly added to the reactants at a rate of 10 parts per hour to initiate polymerization. During polymerization, the system was sealed with nitrogen gas to prevent the invasion of oxygen. After 6.1 hours, when the conversion to polymer reached 84.1% (the maximum polymerization rate=17.0%/hour), the addition of the aqueous solution of hydrogen peroxide was discontinued, and the polymerization was terminated. The emulsion thus obtained had an average particle diameter of 0.51 μm and the number of particles of the polyvinyl acetate per unit volume of the emulsion of $9.6 \times ^{12}$ /ml.

The emulsion thus obtained was poured into a solution of 1 part of hydroquinone monomethyl ether in 35000 parts of methanol at room temperature to dissolve the emulsion with stirring. After dissolution, unreacted vinyl acetate was removed while adding methanol under reduced pressure to give a solution of polyvinyl acetate in methanol.

A portion of the solution was taken out and hydrolyzed at a PVAc concentration of 6%, at a molar ratio of [NaOH]/[VAc]=0.1 at 40° C. to give a polyvinyl alcohol. A 0.1 part portion of the polyvinyl alcohol was reacetylated in a mixed solution of 8 parts of acetic anhydride and 2 parts of pyridine at 105° C. for 20 hours with occasional stirring. Polyvinyl acetate purified by the repeated reprecipitations with a mixed solvent of acetone and ether and with a mixed solvent of acetone and water, had a viscosity average degree of polymerization of 16,000 which was calculated from the intrinsic viscosity thereof in acetone at 30° C.

Next, the methanol solution of polyvinyl acetate was hydrolyzed at a PVAc concentration of 6% at a molar ratio of [NaOH]/[VAc]=0.15 at 40° C. After the removal of the liquid, the resulting polyvinyl alcohol was hydrolyzed again at 40° C. for 24 hours by adding NaOH in the same amount as in the previous hydrolysis and dipping the mixture into methanol. The mixture was then washed with methanol and dried at 40° C. after the removal of liquid to give polyvinyl alcohol. The polyvinyl alcohol had a degree of hydrolysis of 99.8 mol %. The polyvinyl acetate which had been prepared by the reacetylation of the polyvinyl alcohol in the same manner as described above and purified by reprecipitation in the same manner as mentioned above had a viscosity average degree of polymerization of 16,000 which was calculated from the intrinsic viscosity thereof in acetone at 30° C.

The polyvinyl alcohol was dissolved in distilled water under heating at 95° C. to give an aqueous solution of polyvinyl alcohol having a PVA concentration of 4%. The aqueous solution was cast on a polyethylene terephthalate film to form a film by natural drying at room temperature. In addition, the film was stretched uniaxially to 5 times at 180° C. and fixed by heating at 180° C. for 3 minutes in a nitrogen gas atmosphere while maintaining the length of the film to give a polyvinyl alcohol film having a thickness of 20 μm.

The film was placed under a humidity of 65% RH at 20° C., and the physical properties of the film were measured with an autographic recording device under the conditions of a stretching rate of 100 mm/min and a sample length of 50mm. The sample showed a tensile strength of 42 kg/mm$^2$, an elongation of 50% and a Young's modulus of 250 kg/mm$^2$.

Comparative Example 11

Polymerization, hydrolysis and purification were conducted in the same manner as in Example 18 except that the following polymerization conditions were employed, and the degree of hydrolysis and the viscosity average degree of polymerization were measured for the polyvinyl acetate and the polyvinyl alcohol obtained. A polyoxyethylene [POE (40)] nonylphenyl ether (Nonipol 400, a product of Sanyo Chemical Industries, Ltd.) as an emulsifier in an amount of 40 parts was used in place of polyvinyl alcohol as a dispersant to be fed in the reactor, and 1.25 part of Rongalite and 0.12 part of FeSO$_4$.7 H$_2$O were used. Polymerization was initiated in the same conditions as in Example 18 except those described above. After 3.5 hours, when the conversion to polymer reached 60.2% (the maximum polymerization rate=17.2%/hour), the polymerization was terminated. The emulsion thus obtained had an average particle diameter of 0.28 μm and the number of particles of the polyvinyl acetate per unit volume of emulsion of $4.2 \times 10^{13}$/ml.

Hydrolysis and reacetylation were conducted in the same manner as in Example 18 for the emulsion obtained to give purified polyvinyl acetate. The polyvinyl acetate had a viscosity average degree of polymerization of 14,000 which was calculated from the intrinsic viscosity thereof measured in acetone at 30° C.

Next, the methanol solution of polyvinyl acetate was hydrolyzed, rehydrolyzed, washed and dried under the same conditions as in Example 18 to obtain polyvinyl alcohol. The polyvinyl alcohol had a degree of hydrolysis of 99.8 mol %. The polyvinyl alcohol was reacetylated under the same condition as above, and the polyvinyl acetate reprecipitated and purified in the same manner as above had a viscosity average degree of polymerization of 14,000 which was calculated from the intrinsic viscosity thereof measured in acetone at 30° C.

The polyvinyl alcohol was treated in the same manner as in Example 18 to give a polyvinyl alcohol film having a thickness of 21 μm. The film was placed under a humidity of 65% RH at 20° C., and the physical properties of the film were measured with an autographic recording device under the same conditions as those in Example 18. The sample showed a tensile strength of 25.2 kg/mm$^2$, an elongation of 44% and a Young's modulus of 181 kg/mm$^2$.

It can be understood from the above results that while the polyvinyl alcohol film obtained by the emulsion polymerization with an emulsifier shown in Comparative Example 11 has a tensile strength of 25.2 kg/mm$^2$, an elongation of 44% and a Young's modulus of 181 kg/mm$^2$, the polyvinyl alcohol film obtained by the emulsion polymerization under almost the same conditions as above except the use of a polyvinyl alcohol shown in Example 18 as a dispersant has a tensile strength of 42 kg/mm$^2$, an elongation of 50% and a Young's modulus of 250 kg/mm$^2$, so that the latter film is extremely excellent in its film properties.

EXAMPLE 19

In the same reactor as used in Example 18 were fed 1000 parts of deionized water, 1500 parts of vinyl acetate, 60 parts of a polyvinyl alcohol (degree of polymerization, 1700; degree of hydrolysis, 98.5 mol %, PVA-117, a product of Kuraray Co., Ltd.), 0.75 part of Rongalite and 0.04 part of FESO$_4$.7 H$_2$O. The reactants were boiled and then cooled to 40° C. Then, a 0.030% aqueous solution of potassium persulfate which had been separately prepared by using deaerated deionized water was continuously and uniformly added to the reactants at a rate of 5 parts per hour to initiate polymerization. After 3.0 hours, when the conversion to polymer reached 76.8% (the maximum polymerization rate=28.0%/hr), the addition of the aqueous solution of potassium persulfate was discontinued to stop the polymerization. The emulsion thus obtained had an average particle diameter of 0.92 μm and the number of particles of the polyvinyl acetate per unit volume of the emulsion of $2.3 \times 10^{12}$/ml.

The emulsion thus obtained was poured into a solution of 0.6 part of hydroquinone monomethyl ether in 15000 parts of dimethyl sulfoxide at room temperature to dissolve the emulsion with stirring. After dissolution, unreacted vinyl acetate was removed at 70° C. while adding dimethyl sulfoxide under reduced pressure to give a solution of polyvinyl acetate in dimethyl sulfoxide. A portion of the solution was taken out and poured into distilled water to deposit polyvinyl acetate, which was purified several times by reprecipitaion in a mixed solvent of acetone and n-hexane, poured into distilled water again and boiled to give a purified polyvinyl acetate. The polyvinyl acetate was dissolved in methanol to prepare a 10% polyvinyl acetate solution in methanol and hydrolyzed at a molar ratio of [NaOH]/[VAc]=0.10 at 40° C. to give a polyvinyl alcohol. The polyvinyl alcohol was reacetylated and purified under the same conditions as in Example 18 to give polyvinyl acetate. The polyvinyl acetate had a viscosity average degree of polymerization of 4,200.

Next, the 10% polyvinyl acetate solution in dimethyl sulfoxide was hydrolyzed at a molar ratio of [NaOH]/[VAc]=0.15 at 40° C. under nitrogen atmosphere. After the removal of the liquid, the resulting polyvinyl alcohol was hydrolyzed again, washed with methanol and dried in the same manner as in Example 18 to give a purified polyvinyl alcohol. The polyvinyl alcohol had a degree of hydrolysis of 99.8 mol %. The polyvinyl acetate which had been prepared by the reacetylation and purification by reprecipitation in the same manner as mentioned above had a viscosity average degree of polymerization of 4,200.

The polyvinyl alcohol was dissolved in distilled water with heating to 95° C. to give an aqueous solution of polyvinyl alcohol having a concentration of 7%. The aqueous solution was treated in the same manner as in Example 18 to give a polyvinyl alcohol film having a thickness of 20 μm. The film was placed under a humidity of 65% RH at 20° C., and the physical properties of the film were measured with an autographic recording device under the same conditions as those in Example 18. The sample showed a tensile strength of 37.6 kg/mm², an elongation of 48% and a Young's modulus of 230 kg/mm².

Comparative Example 12

Polymerization, hydrolysis and purification were conducted in the same manner as in Example 19 except that the following polymerization conditions were employed, and the degree of hydrolysis and the viscosity average degree of polymerization were measured for the polyvinyl acetate and the polyvinyl alcohol obtained.

Polymerization was started in the same manner as in Example 19 except that 50 parts of an 80% aqueous solution of sodium polyoxyethylene [POE (35)] nonylphenyl ether (Eleminol ES-70, a product of Sanyo Chemical Industries, Ltd.) as an emulsifier was used in place of a polyvinyl alcohol as a dispersant to be fed in the reactor, that 0.90 part of Rongalite and 0.08 part of $FeSO_4.7 H_2O$ were used and that a 0.022% aqueous solution of potassium persulfate was uniformly and continuously added at a rate of 5 parts/hour. After 4.0 hours, when the conversion to polymer reached 77.8% (the maximum polymerization rate=21.0%/hour), the polymerization was terminated. The emulsion thus obtained had an average particle diameter of 0.382 μm and the number of particles of the polyvinyl acetate per unit volume of emulsion of $3.2 \times 10^{13}$/ml.

Hydrolysis and reacetylation were conducted in the same manner as in Example 19 for the emulsion obtained, to give purified polyvinyl acetate. The polyvinyl acetate had a viscosity average degree of polymerization of 3,700 which was calculated from the intrinsic viscosity thereof in acetone at 30° C.

Next, a dimethyl sulfoxide solution of polyvinyl acetate was hydrolyzed, rehydrolyzed, washed with methanol and dried under the same conditions as in Example 19 to obtain polyvinyl alcohol. The polyvinyl alcohol had a degree of hydrolysis of 99.8 mol %. The PVA was reacetylated under the same condition as above, and the polyvinyl acetate reprecipitated and purified in the same manner as above had a viscosity average degree of polymerization of 3,700 which was calculated from the intrinsic viscosity thereof measured in acetone at 30° C.

The polyvinyl alcohol was treated in the same manner as in Example 19 to give a polyvinyl alcohol film having a thickness of 21 μm. The film was placed under a humidity of 65% RH at 20° C., and the physical properties of the film were measured with an autographic recording device under the same conditions as those in Example 19. The sample showed a tensile strength of 21.1 kg/mm². an elongation of 38% and a Young's modulus of 132 kg/mm².

EXAMPLES 20–23

Polymerization, hydrolysis and washing were conducted in the same manner as in Example 18 except that the polymerization conditions specified in Table 5 were employed. In addition, film properties of the polyvinyl alcohol film were measured with polyvinyl alcohols obtained in the same manner as in Example 18.

The conditions and results of emulsion polymerization are shown in Table 5, and the physical properties of the film are shown in Table 6.

TABLE 5

| | Polymerization condition | | | | | | | |
|---|---|---|---|---|---|---|---|---|
| | | | | | Initiator | | | |
| | $H_2O$ (part) | VAc (part) | MeOH (part) | Vinyl alcohol polymer (part) | (a) (%) (part/hr) | (b) (part) | (c) (part) | Temperature (°C.) |
| Example 20 | 1000 | 1000 | 0 | PVA (degree of polymerization, 200; degree of hydrolysis, 88 mol %) 40<br>PVA (degree of polymerization, 8000; degree of hydrolysis, 88 mol %) 6 | $H_2O_2$ (0.020) 10 | $FeSO_4.7H_2O$ 0.10 | Rongalite 1.50 | 25 |
| Example 21 | 1000 | 1000 | 160 | PVA (degree of polymerization, 300; degree of hydrolysis, 70 mol %) 40 | $K_2S_2O_8$ (0.030) 10 | $FeSO_4.7H_2O$ 0.13 | Rongalite 1.50 | −10 |
| Example 22 | 1000 | 800 | 333 | PVA*¹ (degree of polymerization, 300; degree of hydrolysis, 60 mol %) 25 | $K_2S_2O_8$ (0.030) 15 | $FeSO_4.7H_2O$ 0.15 | Rongalite 1.60 | −20 |
| Example 23 | 1000 | 900 | 0 | PVA (degree of polymerization, 500; degree of hydrolysis, 88 mol %) 30 | $H_2O_2$ (0.020) 12 | $FeSO_4.7H_2O$ 0.10 | Rongalite 1.50 | 10 |

| | Results of seed polymerization | | | | | | |
|---|---|---|---|---|---|---|---|
| | Polymerization time (hr) | Conversion (%) | Maximum polymerization rate (%/hr) | Particle diameter (μm) | Number of particle (ml⁻¹) | Average degree of polymerization of vinyl ester polymer | Vinyl alcohol polymer | |
| | | | | | | | Average degree of polymerization | Degree of hydrolysis (mol %) |
| Example 20 | 4.5 | 64 | 14.2 | 0.66 | $3.2 \times 10^{12}$ | 11,000 | 11,000 | 99.8 |
| Example 21 | 5.0 | 61 | 13.5 | 0.82 | $1.4 \times 10^{12}$ | 20,000 | 20,000 | 99.8 |
| Example 22 | 6.0 | 56 | 10.2 | 1.62 | $1.11 \times 10^{11}$ | 24,000 | 24,000 | 99.8 |
| Example 23 | 5.0 | 83 | 17.4 | 1.43 | $3.7 \times 10^{11}$ | 14,000 | 14,000 | 99.8 |

*¹Copolymer of 3 mol % of sodium allylsulfonate.

TABLE 6

| | Film | | Mechanical properties of film | | |
|---|---|---|---|---|---|
| | Stretch ratio (times) | Thickness (μm) | Strength (kg/mm²) | Elongation (%) | Young's modulus (kg/mm²) |
| Example 20 | 5 | 20 | 46.4 | 52 | 290 |

TABLE 6-continued

| | Film | | Mechanical properties of film | | |
|---|---|---|---|---|---|
| | Stretch ratio (times) | Thickness ($\mu$m) | Strength (kg/mm$^2$) | Elongation (%) | Young's modulus (kg/mm$^2$) |
| Example 21 | 5 | 21 | 48.1 | 54 | 300 |
| Example 22 | 5 | 22 | 53.9 | 57 | 350 |
| Example 23 | 5 | 20 | 44.9 | 50 | 280 |

Comparative Example 13

Polymerization, hydrolysis and purification were performed in the same manner as in Example 18 except that the following polymerization conditions were used, and the degree of hydrolysis and the viscosity average degree of polymerization of a polyvinyl acetate and a polyvinyl alcohol thus obtained were measured.

A 40 parts portion of a 35% aqueous solution of sodium polyoxyethylene [POE (30)] lauryl ether sulfate (TRACKS K-300, a product of Nippon Oil & Fats Co., Ltd.) as an emulsifier, 1.40 parts of Rongalite and 0.15 part of FeSO$_4$.7 H$_2$O were used in place of polyvinyl alcohol as a dispersant fed into a reactor, and 360 parts of methanol was added. The mixture was cooled to $-20°$ C., and polymerization was initiated in the same manner as in Example 18 except that a 0.020% aqueous solution of hydrogen peroxide was uniformly and continuously added at a rate of 10 parts/hr. After 6.0 hours, when the conversion to polymer reached 51.2% (the maximum polymerization rate=91%/hr), polymerization was terminated. The emulsion thus obtained had an average particle diameter of 0.317 $\mu$m and the number of particles of the polyvinyl acetate per unit volume of the emulsion of $1.7 \times 10^{13}$/ml.

The emulsion thus obtained was poured into a solution of 1 part of hydroquinone monomethyl ether in 70000 parts of methanol, and the emulsion was dissolved with stirring. The polyvinyl acetate had a viscosity average degree of polymerization of 24,000, and the polyvinyl alcohol obtained by the hydrolysis of the polyvinyl acetate had a degree of hydrolysis of 99.8 mol % and a viscosity average degree of polymerization of 24,000.

The polyvinyl alcohol was dissolved in distilled water under heating to 95° C. to give a 3.5% aqueous solution of polyvinyl alcohol. The aqueous solution was treated in the same manner as in Example 18 to give a polyvinyl alcohol film having a thickness of 20 $\mu$m. The film was placed under a humidity of 65% RH at 20° C., and the physical properties of the film were measured with an automatic recording device. The film had a tensile strength of 26.3 kg/mm$^2$, an elongation of 45% and a Young's modulus of 190 kg/mm$^2$.

The polyvinyl alcohol film obtained in Comparative Example 13 in which an emulsifier was used as a dispersant is inferior in film properties in comparison with the films obtained in Examples 21 and 22.

(a) Experiment A-1

The procedure of Example 1 of the present specification above was repeated to effect polymerization, hydrolysis, purification and the like, except that the production conditions of the seed emulsion and the conditions of the seed polymerization were altered to the conditions described in the following Table 7. In addition, measurements were made for the viscosity average degree of polymerization and the degree of hydrolysis of the polyvinyl alcohol which was produced by hydrolysis of polyvinyl acetate in the same manner as in Example 1. The results are given in Table 7 below.

(b) Experiment A-2

The procedure in the preceding Experiment A-1 was repeated, except that the seed polymerization was conducted for 7.0 hours instead of 6.5 hours. The results are also given in Table 7 below.

TABLE 7

| | Conditions for producing seed emulsions | | | | | | | |
|---|---|---|---|---|---|---|---|---|
| | | | | | Initiator | | | |
| Run No. | Water (part) | Vinyl acetate (part) | Methanol (part) | Emulsifier (part) | (a) (%) (part/hr) | (b) (part) | (c) (part) | Temperature (°C.) |
| A-1 and A-2 | 500 | 12 | 0 | Sodium polyoxyethylene [POE (30)] lauryl ether sulfate (36.5%) 12.0 | H$_2$O$_2$ (0.003) 15 | FeSO$_4$.7H$_2$O 0.03 | Rongalite 0.22 | 25 |

| | Results of production of seed emulsions | | | | Condition of seed polymerization | | | | |
|---|---|---|---|---|---|---|---|---|---|
| | | | | | Additives on seed polymerization | | | | |
| Run No. | Polymerization time (hour) | Conversion (%) | Particle diameter ($\mu$m) | Number of particles (ml$^{-1}$) | Coverage (%) | H$_2$O (part) | VAc (part) | MeOH (part) | Emulsifier (part/hr) | Initiator (a) (part/hr) |
| A-1 and A-2 | 0.8 | 36.8 | 0.029 | $5.6 \times 10^{14}$ | 328 | 500 | 1070 | 375 | Sodium polyoxyethylene[POE(3)] lauryl ether sulfate (18.25%) 20 | H$_2$O$_2$ (0.003%) 7 |

| | Conditions of seed polymerization | | | | |
|---|---|---|---|---|---|
| Run No. | Temperature (°C.) | Charge A (mol/l) | Charge B (mol/particle) | Charge C (mol/l · sec) | Y value |
| A-1 and A-2 | $-20$ | $1.52 \times 10^{-5}$ | $5.43 \times 10^{-23}$ | $6.03 \times 10^{-10}$ | $1.29 \times 10^{-3}$ |

| | Polymerization time | | Average degree of polymerization of vinyl ester polymer | | vinyl alcohol polymer | |
|---|---|---|---|---|---|---|
| Run No. | (hr) | Conversion (%) | before hydrolysis *1 | after hydrolysis *2 | average degree of polymerization | degree of hydrolysis (mol %) |
| A-1 | 6.5 | 77.0 | 43200 | 27100 | 27100 | 99.8 |

TABLE 7-continued

| A-2 | 7.0 | 82.1 | 48500 | 23800 | 23800 | 99.8 |

*1 Sample polyvinyl acetate was purified, and the purified one was measured as such.
*2 Measurement was made in the same manner as in Example 1.

EXAMPLE 25

In order to prove that emulsion polymerization under reduced pressure is a highly valuable process in practical use, the following experiment was carried out.

(a) Experiment B-1

By the use of the same reactor as in Example 1 of the present specification above, seed polymerization under ordinary pressure was effected in the same manner as in Example 1 ten times repeatedly without cleaning the reactor.

(b) Experiment B-2

By the use of the same reactor as in Example 1 of the present specification above, seed polymerization under a degree of vacuum of 125 Torr was effected in the same manner as in Example 12 ten times repeatedly without cleaning the reactor.

No difference was recognized at all between Experiment B-1 and Experiment B-2 in temperature control during the first seed polymerization. However, during the tenth seed polymerization in Experiment B-1, a scale adhered to the inside walls of the reactor and the cooling pipe, thus disabling temperature control. By contrast, in Experiment B-2, no scale adhered to the inside walls of the reactor or the cooling pipe even during the tenth seed polymerization, thus enabling satisfactory temperature control of the polymerization conducted under vacuum.

EXAMPLE 26

In order to prove that emulsion polymerization of a monomer consisting essentially of a vinyl ester alone by the use of a vinyl alcohol polymer as a dispersant markedly improves the physical properties of the resultant polymer, the following experiment was carried out.

Experiment C

The procedure in Example 1 of Daniels et al (U.S. Pat. No. 4,164,489) was repeated. An ethylene/vinyl acetate copolymer emulsion was produced by means of emulsion copolymerization of ethylene and vinyl acetate, except that:

(i) An aqueous emulsion of an ethylene/vinyl acetate copolymer was used as the seed emulsion. The emulsion further contained 3 parts by weight of polyoxyethylene nonylphenyl ether ("Nonipol 400," a product of Sanyo Chemical Industries, Ltd.) as a dispersion stabilizer, based on 100 parts by weight of the dispersoid. The dispersoid had an average particle size of 0.17 μm, a glass transition temperature of 0° C. and a solid concentration of 50% by weight. This dispersoid was used in place of the aqueous emulsion having a solid concentration of 55% by weight in Example 1 of Daniels et al (U.S. Pat. No. 4,164,489);

(ii) A polyvinyl alcohol having a degree of polymerization of 500 and a degree of hydrolysis of 88 mol % was used in place of the product available from Air Products and Chemicals, Inc. under the trade name "Vinol 205" in Example 1 of the Daniels et al patent;

(iii) A polyvinyl alcohol having a degree of polymerization of 1700 and a degree of hydrolysis of 88 mol % was used in place of the product available from Air Products and Chemicals, Inc. under the trade name "Vinol 523" in Example 1 of the Daniels et al patent;

(iv) The reaction conditions in the first reaction vessel were adjusted to an ethylene pressure of 27 kg/cm$^2$ and a temperature of 40° C. in place of 925 psig (65 kg/cm$^2$) and 120° F. (48.9° C.), respectively, in Example 1 of the Daniels et al patent; and (v) The reaction conditions in the second reaction vessel were adjusted to an ethylene pressure of 15 kg/cm$^2$ and a temperature of 25° C. in place of 10 psig (0.7 kg/cm$^2$) and 120° F. (48.9° C.), respectively, in Example 1 of the Daniels et al patent.

Thereafter, the ethylene/vinyl acetate copolymer thus obtained was hydrolyzed to produce an ethylene/vinyl alcohol copolymer having a degree of hydrolysis of 99.9 mol % in the same manner as in Example 1 of the present specification above, except that the [NaOH]/[VAc] molar ratio was set to 0.3.

The degree of polymerization of the ethylene/vinyl alcohol copolymer thus produced was measured by the same procedure as in Example 1 of the present specification above. The observed average degree of polymerization in this example (Example 26) was 1000.

Subsequently, an ethylene/vinyl alcohol copolymer film was produced in the same manner as in Example 18 of the present specification above, except that the thus-obtained ethylene/vinyl alcohol copolymer was used, and the solvent was n-propanol/water in a ratio of 50/50 by weight. Moreover, the physical properties of the film thus obtained were measured in the same manner as in Example 18 of the present specification above. As a result, the tensile strength of the ethylene/vinyl alcohol polymer film was no higher than 4 kg/mm$^2$; that is, only one-tenth the tensile strength of the film produced in said Example 18, which was 42 kg/mm$^2$.

From the results of Experiment A above (Example 24), the following conclusions can be surmised:

(1) The average degree of polymerization of the vinyl ester polymer before hydrolysis in Experiment A-2, being 48,500 at a conversion to polymer of 82.1%, is greater by 5300 (12.3%) than that in Experiment A-1, being 43,200 at a conversion to polymer of 77.0% (=48,500−43,200). However, the average degree of polymerization of the vinyl alcohol polymer in Experiment A-1, being 27,100 at a conversion to polymer of 77.0%, is greater by 3300 (13.9%) than that in Experiment A-2, being 23,800 at a conversion to polymer of 82.1% (=27,100−23,800).

Specifically, a conversion to polymer of 82.1% considerably decreases the average degree of polymerization of the vinyl alcohol polymer to be produced, as directly compared with a conversion to polymer in the range of from 20% to 78.9% according to the present invention. Thus, it is difficult to attain a vinyl alcohol polymer having a corresponding high degree of polymerization from a vinyl ester polymer prepared by a process having a conversion to polymer exceeding 80%. The cause for the above-mentioned result may be the fact that a conversion to polymer exceeding 80% is apt to bring about a chain transfer reaction to polymer rather than monomer, thus increasing the branched structure in the polymer. As a result, the resultant polymer is liable to break during a subsequent hydrolysis reaction.

In contrast to the present invention, Daniels et al (U.S. Pat. No. 4,164,489) disclose high conversions to polymer (in the range of 80 to 95%), during seed polymerization, while Erickson et al (U.S. Pat. No. 4,226,752) disclose a still higher conversion to polymer (100%, described as perfect polymerization). Therefore, the average degree of polymerization of the vinyl alcohol polymer produced by the processes of Daniels et al and Erickson et al is lower than that of the polymer produced by the process according to the present invention.

(2) As is clear from the results of Experiment B (Example 25), the emulsion polymerization process under reduced pressure of the present invention enables efficient removal of polymerization heat, and minimizes the possibility of scale adhesion to the inside walls of reactors, as directly compared with emulsion polymerization under ordinary pressure or under a pressurized state. Accordingly, the present reduced-pressure process enables satisfactory temperature control during the polymerization reaction, even if the same reactor is employed for polymerization ten times (or more) repeatedly without cleaning. Thus, the present reduced-pressure process is highly valuable in commercial applications.

(3) As is clear from the results of Experiment C (Example 26), the film of the ethylene/vinyl alcohol copolymer obtained by hydrolyzing the ethylene/vinyl acetate copolymer produced by the process described in Daniels et al (U.S. Pat. No. 4,164,489) is considerably inferior in tensile strength to the film of the corresponding vinyl alcohol polymer obtained by the process of the present application. Therefore, the present process is useful as a process for producing vinyl alcohol polymers having excellent physical properties.

What is claimed is:

1. A process for producing a vinyl alcohol polymer having an average degree of polymerization of 4000 to 100,000, comprising seed polymerizing a monomer consisting essentially of a vinyl ester monomer to a conversion of from 20.0% to 78.9% in a seed emulsion containing a vinyl ester seed polymer and a water-soluble initiator to produce a vinyl ester polymer, said water-soluble initiator being present in an amount of from $1\times10^{-8}$ to $2\times10^{-4}$ mol per liter of said liquid reactant and from $1\times10^{-28}$ to $1\times10^{-20}$ mol per particle of said vinyl ester seed polymer, and hydrolyzing said vinyl ester polymer.

2. The process of claim 1, wherein said emulsion polymerizing is continuous.

3. The process of claim 1, consisting essentially of said seed polymerizing and hydrolyzing steps.

4. The method of claim 1, wherein said seed polymerizing is effected at a temperature of from $-60°$ to $40°$ C.

5. The method of claim 1, wherein said seed polymerizing is continuous.

6. The process according to claim 1, wherein said seed polymerizing is effected at a polymerization temperature of $-60$ to $40°$ C.

7. The process according to claim 1, wherein the average particle diameter of the vinyl ester polymer particles in the seed emulsion is 0.005 to 0.5μm, and the number of particles of the vinyl ester seed polymer per unit volume (1 ml) of the seed emulsion is $10^{12}$ to $10^{16}$, each at the time of beginning the seed polymerization.

8. The process according to claim 1, wherein said seed polymerization is started under the condition in which the ratio by weight of (A) the vinyl ester polymer in the seed emulsion to the total of (A) the vinyl ester polymer and (B) the vinyl ester seed monomer ((A)+(B)) at the time of beginning the seed polymerization is 0.01 to 20%.

9. The process according to claim 1, wherein said seed polymerizing process is a continuous polymerization process.

10. A process for producing a vinyl alcohol polymer having an average degree of polymerization of 4000 to 100,000, comprising emulsion polymerizing a monomer consisting essentially of a vinyl ester monomer at a temperature of $-60°$ to $40°$ C. in the presence of a vinyl alcohol polymer selected from the group consisting of a polyvinyl alcohol composed of vinyl alcohol units alone, a copolymer comprising vinyl alcohol units and a block copolymer comprising polyvinyl alcohol as one segment to produce a vinyl ester polymer, and hydrolyzing said vinyl ester polymer.

11. The process of claim 10, consisting essentially of said emulsion polymerizing and hydrolyzing steps.

* * * * *